(12) United States Patent
Hernández et al.

(10) Patent No.: US 11,703,616 B2
(45) Date of Patent: Jul. 18, 2023

(54) FLUID LENS WITH LOW GAS CONTENT FLUID

(71) Applicant: META PLATFORMS TECHNOLOGIES, LLC, Menlo Park, CA (US)

(72) Inventors: Hayden Erik Hernández, Oxford (GB); Thomas Norman Llyn Jacoby, Oxford (GB); Robert Edward Stevens, Eynsham (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 325 days.

(21) Appl. No.: 17/075,040

(22) Filed: Oct. 20, 2020

(65) Prior Publication Data
US 2021/0132267 A1    May 6, 2021

Related U.S. Application Data

(60) Provisional application No. 62/930,788, filed on Nov. 5, 2019.

(51) Int. Cl.
*G02B 3/14*    (2006.01)
*G02B 1/04*    (2006.01)

(52) U.S. Cl.
CPC ............... *G02B 3/14* (2013.01); *G02B 1/041* (2013.01)

(58) Field of Classification Search
CPC .................................. G02B 3/12; G02B 1/041
USPC ........................................................ 359/665
See application file for complete search history.

(56) References Cited

U.S. PATENT DOCUMENTS

| | | |
|---|---|---|
| 5,138,494 A | 8/1992 | Kurtin |
| 5,371,629 A | 12/1994 | Kurtin et al. |
| 5,668,620 A | 9/1997 | Kurtin et al. |
| 5,696,521 A | 12/1997 | Robinson et al. |
| 5,956,183 A | 9/1999 | Epstein et al. |
| 5,999,328 A | 12/1999 | Kurtin et al. |
| 7,256,943 B1 | 8/2007 | Kobrin et al. |
| 8,254,034 B1 | 8/2012 | Shields et al. |
| 10,634,824 B1 | 4/2020 | Ouderkirk et al. |
| 2003/0095336 A1 | 5/2003 | Floyd |
| 2004/0156983 A1 | 8/2004 | Moravec et al. |
| 2006/0077562 A1 | 4/2006 | Silver |
| 2006/0163612 A1 | 7/2006 | Kouvetakis et al. |

(Continued)

FOREIGN PATENT DOCUMENTS

| | | |
|---|---|---|
| WO | 2013/143630 A1 | 10/2013 |
| WO | 2017/055787 A2 | 4/2017 |

(Continued)

*Primary Examiner* — Collin X Beatty
(74) *Attorney, Agent, or Firm* — Greenberg Traurig, LLP

(57) ABSTRACT

An example device includes a fluid lens, where the fluid lens includes a membrane, a substrate, and a fluid located within an enclosure formed at least in part by the membrane and the substrate. The membrane may be an elastic membrane. The fluid may include an amount of an additive that is effective to appreciably reduce bubble formation within the fluid, such as when a negative pressure is applied to the fluid. In some examples, the additive may include particles, such as nanoparticles. The additive may include a thixotropic agent that helps to impart an appreciable thixotropic property to the fluid. Various other methods, systems, and computer-readable media are also disclosed.

18 Claims, 19 Drawing Sheets

(56) References Cited

U.S. PATENT DOCUMENTS

| | | |
|---|---|---|
| 2007/0187242 A1* | 8/2007 | Nair .................. G02F 1/167 204/450 |
| 2007/0279585 A1 | 12/2007 | Bartoli |
| 2008/0001169 A1 | 1/2008 | Lochtefeld |
| 2008/0207846 A1 | 8/2008 | Henze et al. |
| 2008/0239503 A1 | 10/2008 | Conradi et al. |
| 2008/0257409 A1 | 10/2008 | Li et al. |
| 2009/0116118 A1* | 5/2009 | Frazier .................. G02B 3/14 359/666 |
| 2009/0147371 A1 | 6/2009 | Lee et al. |
| 2010/0068866 A1 | 3/2010 | Yu et al. |
| 2010/0118413 A1 | 5/2010 | Kim et al. |
| 2010/0176375 A1 | 7/2010 | Lochtefeld |
| 2010/0182703 A1 | 7/2010 | Bolis |
| 2010/0252861 A1 | 10/2010 | Lochtefeld |
| 2011/0085131 A1 | 4/2011 | Gupta et al. |
| 2011/0085243 A1 | 4/2011 | Gupta et al. |
| 2012/0041553 A1 | 2/2012 | Gupta et al. |
| 2012/0287512 A1 | 11/2012 | Egan et al. |
| 2014/0077220 A1 | 3/2014 | Kryliouk et al. |
| 2014/0253873 A1 | 9/2014 | Crosby et al. |
| 2014/0261611 A1 | 9/2014 | King et al. |
| 2015/0055084 A1 | 2/2015 | Stevens et al. |
| 2015/0116656 A1 | 4/2015 | Stevens et al. |
| 2015/0185480 A1 | 7/2015 | Ouderkirk et al. |
| 2016/0049299 A1 | 2/2016 | Ko et al. |
| 2016/0223837 A1 | 8/2016 | Holland et al. |
| 2017/0269378 A1 | 9/2017 | Stevens et al. |
| 2019/0097080 A1 | 3/2019 | Ide |
| 2019/0258084 A1 | 8/2019 | Stevens et al. |

FOREIGN PATENT DOCUMENTS

| | | | |
|---|---|---|---|
| WO | WO-2017116892 A1 * | 7/2017 | ............ G06F 3/041 |
| WO | 2018/158347 A1 | 9/2018 | |
| WO | 2019/186181 A1 | 10/2019 | |

* cited by examiner

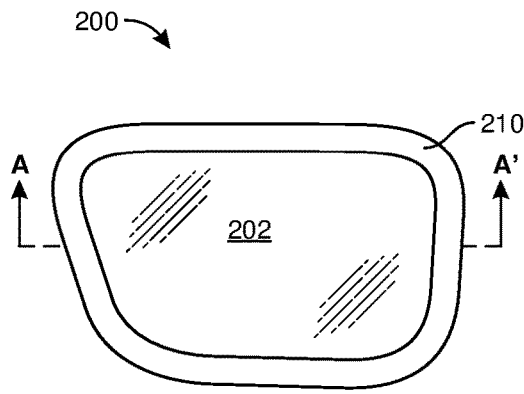
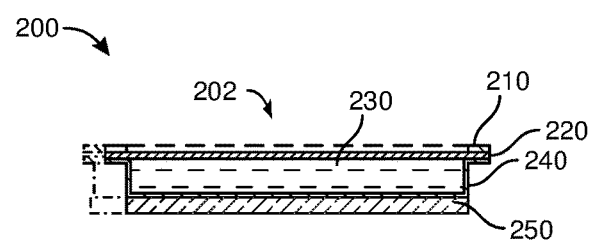
FIG. 2A         FIG. 2B
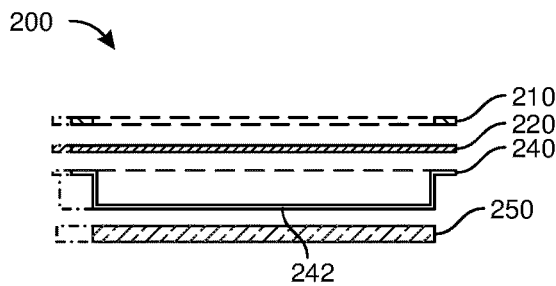
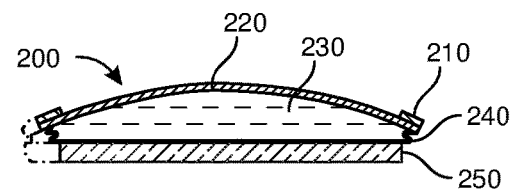
FIG. 2C         FIG. 2D

FLUID LENS WITH LOW GAS CONTENT FLUID

CROSS REFERENCE TO RELATED APPLICATION

This application claims the benefit of U.S. Provisional Application No. 62/930,788, filed Nov. 5, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 2A-2G illustrate example fluid lenses and adjustment of the optical power of the fluid lenses.

Figure 1A:
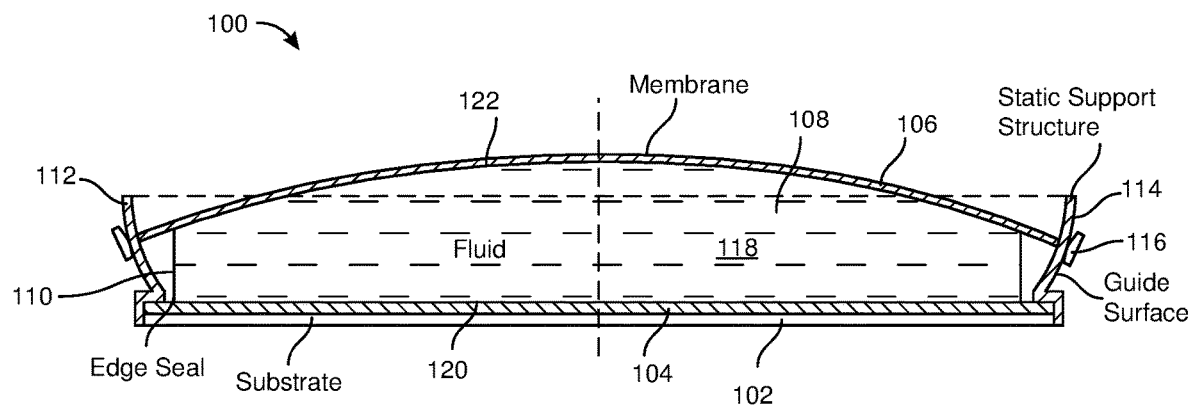
FIGS. 1A-1C illustrate example fluid lenses.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure also covers all modifications, equivalents, and alternatives falling within the scope of the appended claims.

DETAILED DESCRIPTION OF EXEMPLARY EMBODIMENTS

The present disclosure is generally directed to fluid lenses, which include liquid lenses. Examples include adjustable fluid lenses, such as fluid lenses including a lens fluid in which the gage pressure of the lens fluid is adjustable to a negative value in use. Embodiments of the present disclosure may also include fluid lenses including a lens fluid having a gas content that may be controlled to reduce the likelihood of bubble formation in the lens fluid.

As is explained in greater detail herein, embodiments of the present disclosure include fluid lenses, membranes used in fluid lenses, membrane assemblies, and improved devices using fluid lenses, such as ophthalmic devices, augmented reality devices, virtual reality devices, and the like. These fluid lenses may include a substrate and a membrane, at least in part enclosing a lens enclosure. The lens enclosure may be referred to hereinafter as an "enclosure" for conciseness. The enclosure may receive the lens fluid, and the interior surface of the enclosure may be proximate the fluid. In some examples, the lens fluid (sometimes referred to herein more concisely as the "fluid") may include an additive that helps reduce bubble formation within the fluid. The additive may increase the cohesive energy of the fluid, and may reduce gas solubility.

Features from any of the embodiments described herein may be used in combination with one another in accordance with the general principles described herein. These and other embodiments, features, and advantages will be more fully understood upon reading the detailed description in conjunction with the accompanying drawings and claims.

Figure 6:
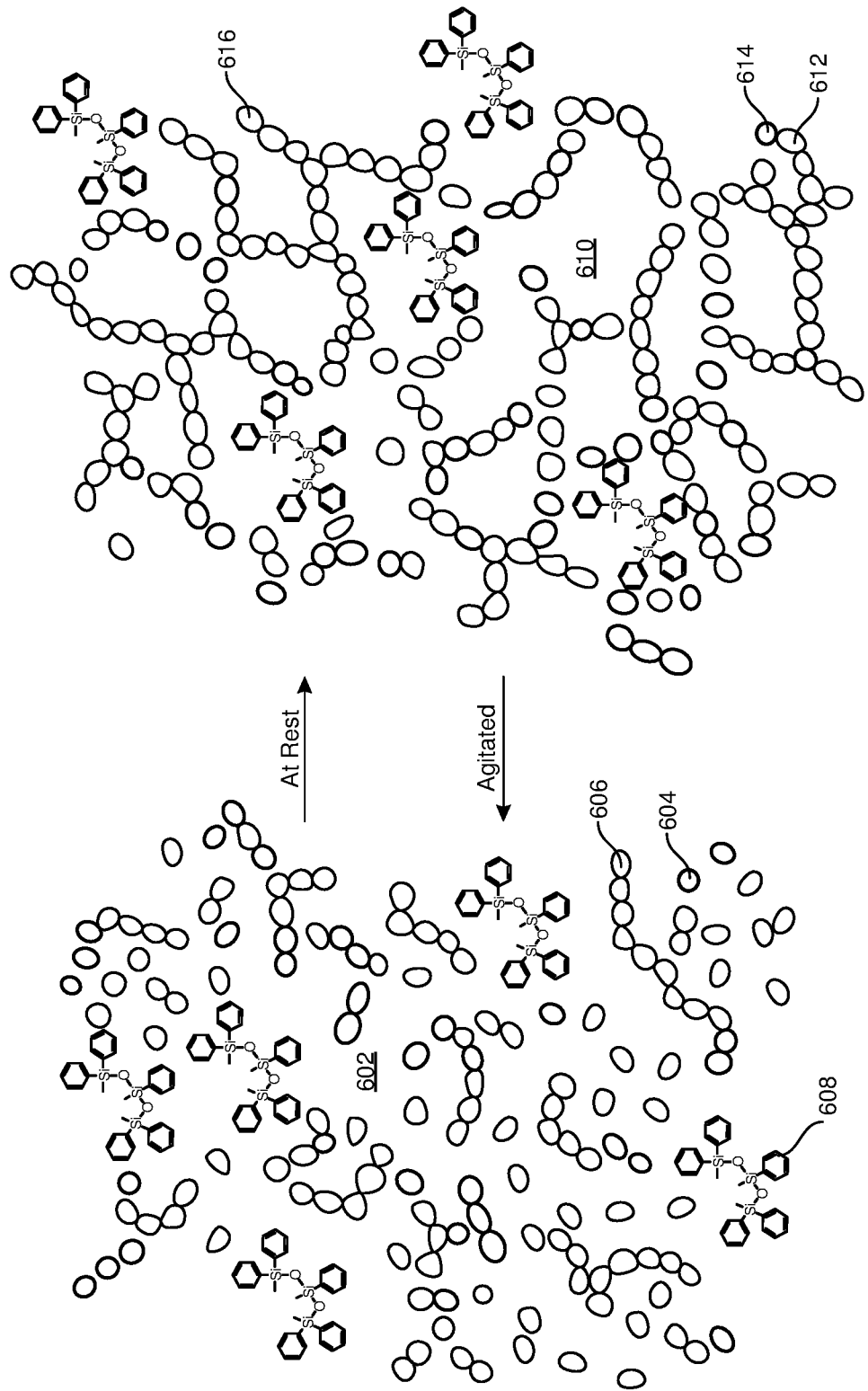
FIG. 6 illustrates a lens fluid including a thixotropic additive, according to some embodiments.
Figure 7:
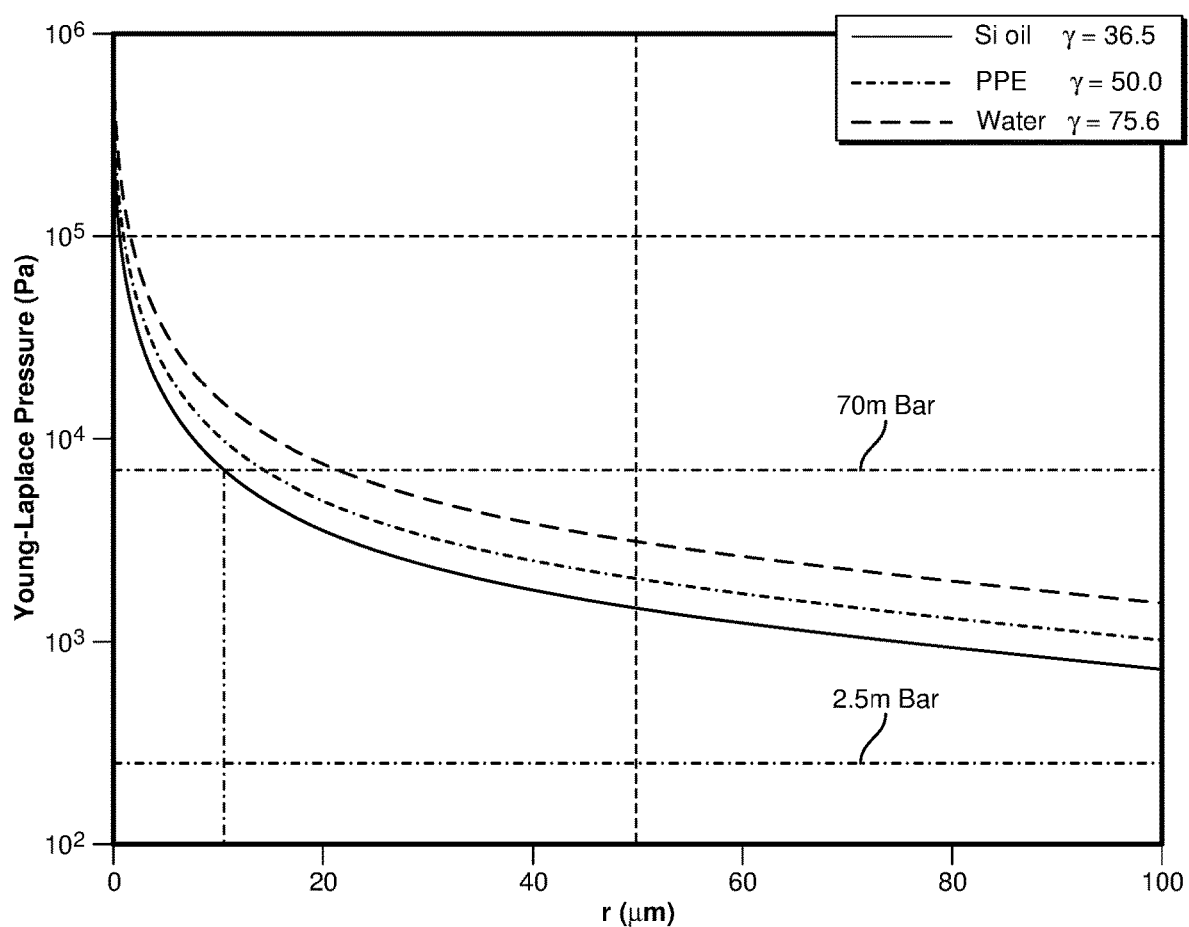
FIG. 7 illustrates the Young-Laplace pressure, as a function of bubble radius, for different liquids, according to some embodiments.
Figure 9:
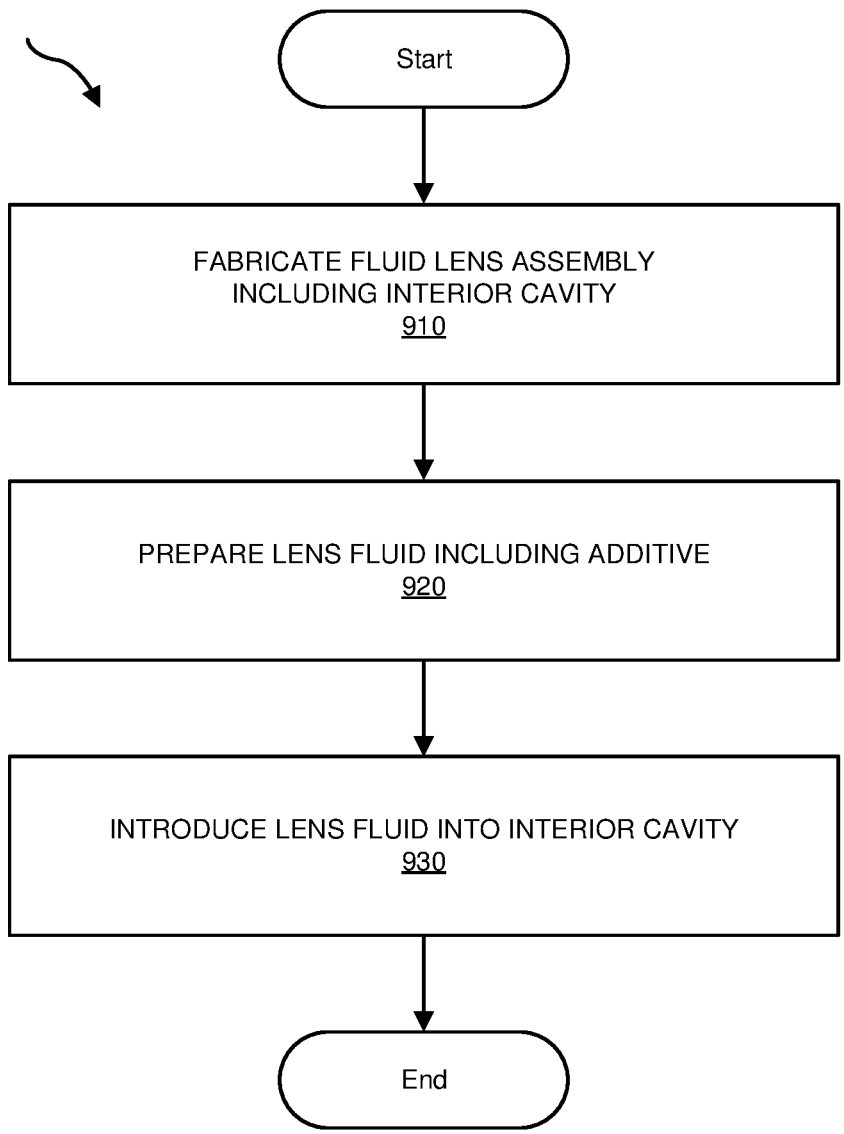
FIGS. 9 and 10 illustrate example methods of fabricating a fluid lens having a lens fluid having a reduced gas solubility, according to some embodiments.
Figure 10:
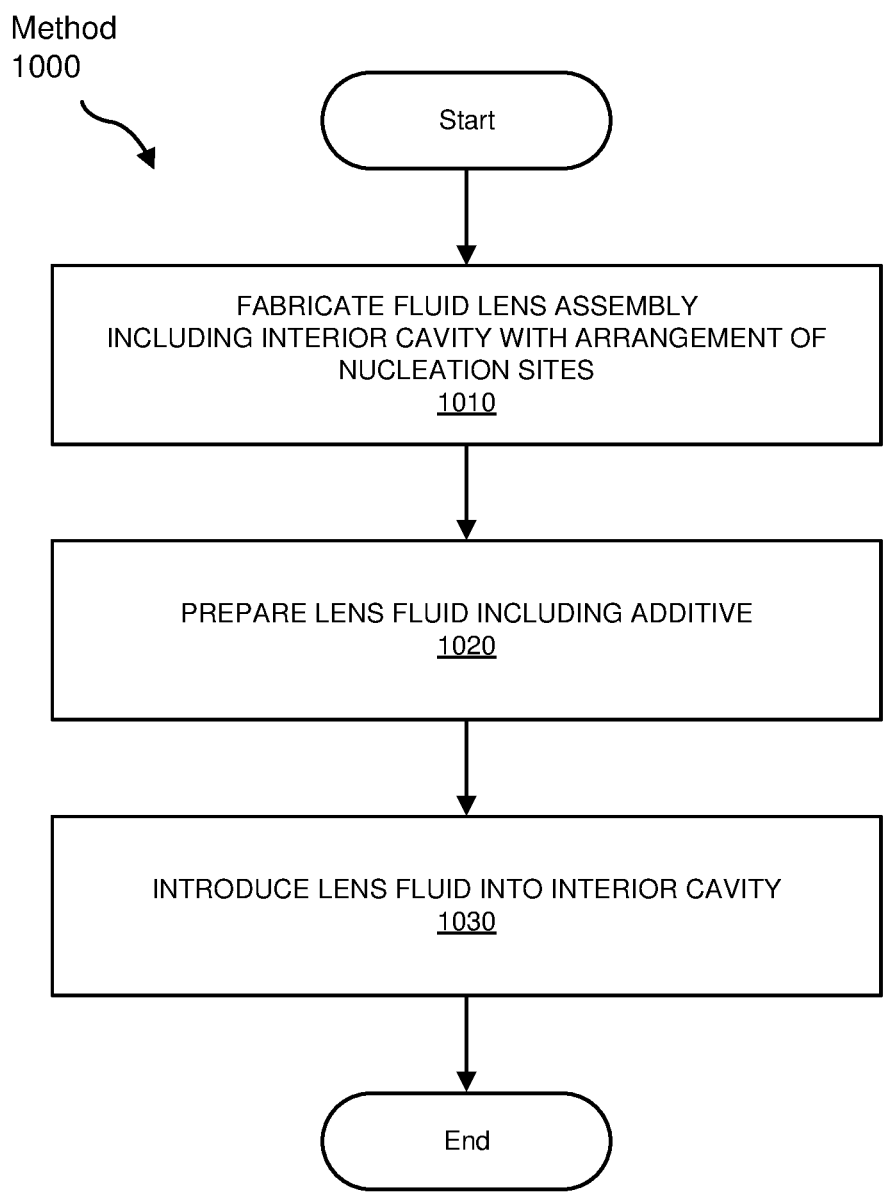

The following provides, with reference to FIGS. 1-16, detailed descriptions of fluid lenses, including fluid lenses having a reduced propensity for bubble formation. FIGS. 1-5 illustrate example fluid lenses. FIG. 6 illustrates a lens fluid including an additive, in this example a thixotropic additive that imparts a thixotropic property to the lens fluid, which may then be termed a thixotropic fluid or thixotropic lens fluid. FIG. 7 illustrates the Young-Laplace pressure as a function of bubble radius for different liquids, which relates to bubble formation. FIGS. 8A-8D illustrate gas bubble nucleation within a lens fluid. FIGS. 9 and 10 illustrate example methods of fabricating a fluid lens having a lens fluid having a reduced gas solubility. FIGS. 11-16 illustrate example augmented reality and/or virtual reality devices, which may include one or more of the various fluid lenses detailed in this disclosure.

In fluid lenses, the application of negative pressure (e.g., reduced pressure in the liquid enclosure) may increase the possibility of bubble formation on an interior surface of the lens enclosure. Bubble formation may be induced by nucleation on surface defects. Bubble formation may be reduced, in contrast, by having a lens fluid that is maintained above atmospheric pressure, so that it is energetically unfavorable for a bubble to form. However, this may restrict the adjustments that are available to a surface of the fluid lens, for example, to convex lens surfaces only. A greater range of optical powers may be achieved by applying a negative pressure to the lens fluid, which may induce a concave membrane profile. (In this context, the term "concave" may refer to the external surface of the membrane, with a concave lens tending to be narrower in the center of the lens). However, any design requirement of elevated fluid pressure (relative to atmospheric pressure) may be in direct conflict with such device configurations. Bubble formation may also be reduced by fabricating relatively small diameter lenses (e.g., a smaller diameter than typically used for ophthalmic lenses) that may have relatively low tension membranes. However, the applications of such reduced diameter lenses may be correspondingly restricted.

In some examples, an adjustable fluid lens (such as a liquid lens) includes a pre-strained flexible membrane that at least partially encloses a fluid volume, a fluid enclosed within the fluid volume, a flexible edge seal that defines a periphery of the fluid volume, and an actuation system configured to control the edge of the membrane such that the optical power of the lens can be modified. In some examples, movement of an edge portion of the membrane, such as a control point, along a guide path provided by a support structure may result in no appreciable change in the elastic energy of the membrane. The membrane profile may be adjusted by movement of a plurality of control points along respective guide paths, and, in some examples, this may result in no appreciable change in the elastic energy of the membrane. The membrane may be an elastic membrane, and the membrane profile may be a curved profile providing a refractive surface of the fluid lens.

FIG. 1A depicts a cross-section through a fluid lens, according to some examples. The fluid lens 100 illustrated in this example includes a substrate 102, a substrate coating 104, a membrane 106, a fluid 108 (denoted by dashed horizontal lines), an edge seal 110, a support structure 112 providing a guide surface 114, and a membrane attachment 116. In this example, the substrate 102 is a generally rigid, planar substrate having a lower (as illustrated) outer surface, and an interior surface on which the substrate coating 104 is supported. However, one or both surfaces of the substrate may be spherical, sphero-cylindrical or formed with a more complex surface shape of the kind typically found in an ophthalmic lens (e.g. progressive, digressive, bifocal and the like). The interior surface 120 of the substrate coating 104 is in contact with the fluid 108. The membrane 106 has an upper (as illustrated) outer surface and an interior surface 122 bounding the fluid 108. The substrate coating 104 is optional, and may be omitted.

The fluid 108 is enclosed within an enclosure 118, which is at least in part defined by the substrate 102 (along with the substrate coating 104), the membrane 106, and the edge seal 110, which here cooperatively define the enclosure 118 in which the fluid 108 is located. The edge seal 110 may extend around the periphery of the enclosure 118, and retain (in cooperation with the substrate and the membrane) the fluid within the enclosed fluid volume of the enclosure 118. In some examples, an enclosure may be referred to as a cavity or lens cavity.

In this example, the membrane 106 is shown with a curved profile, so that the enclosure has a greater thickness in the center of the lens than at the periphery of the enclosure (e.g., adjacent the edge seal 110). The profile of the membrane is adjustable in a manner known in the art for adjusting the optical power of the fluid lens 100. In some examples, the fluid lens may be a plano-convex lens, with the planar surface being provided by the substrate 102 and the convex surface being provided by the membrane 106. A plano-convex lens may have a thicker layer of lens fluid around the center of the lens. In some examples, the exterior surface of a membrane may provide the convex surface, with the interior surface being substantially adjacent the lens fluid.

The support structure 112 (which in this example may include a guide slot through which the membrane attachment 116 may extend) may extend around the periphery (or within a peripheral region) of the substrate 102, and may attach the membrane to the substrate. The support structure may provide a guide path, in this example a guide surface 114 along which a membrane attachment 116 (e.g., located within an edge portion of the membrane) may slide. The membrane attachment may provide a control point for the membrane, so that the guide path for the membrane attachment may provide a corresponding guide path for a respective control point.

The fluid lens 100 may include one or more actuators (not shown in FIG. 1A) that may be located around the periphery of the lens and may be part of or mechanically coupled to the support structure 112. The actuators may exert a controllable force on the membrane at one or more control points, such as provided by membrane attachment 116, that may be used to adjust the curvature of the membrane surface and hence at least one optical property of the lens, such as focal length, astigmatism correction, surface curvature, cylindricity, or any other controllable optical property. In some examples, the membrane attachment may be attached to an edge portion of the membrane, or to a peripheral structure extending around the periphery of the membrane (such as a peripheral guide wire, or a guide ring), and may be used to control the curvature of the membrane.

In some examples, FIG. 1A may represent a cross-section through a circular lens, though examples fluid lenses may also include non-circular lenses, as discussed further below.

Figure 1B:
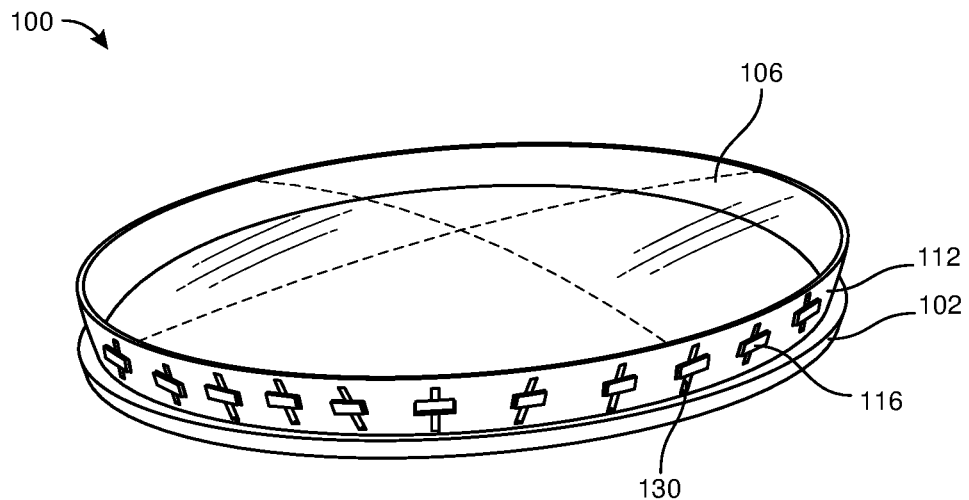

FIG. 1B shows a fluid lens, of which FIG. 1A may be a cross-section. The figure shows the fluid lens 100, including the substrate 102, the membrane 106, and the support structure 112. In this example, the fluid lens 100 may be a circular fluid lens. The figure shows the membrane attachment 116 as moveable along a guide path defined by the guide slot 130 and the profile of the guide surface 114 (shown in FIG. 1A). The dashed lines forming a cross are visual guides indicating a general exterior surface profile of the membrane 106. In this example, the membrane profile may correspond to a plano-convex lens.

Figure 1C:
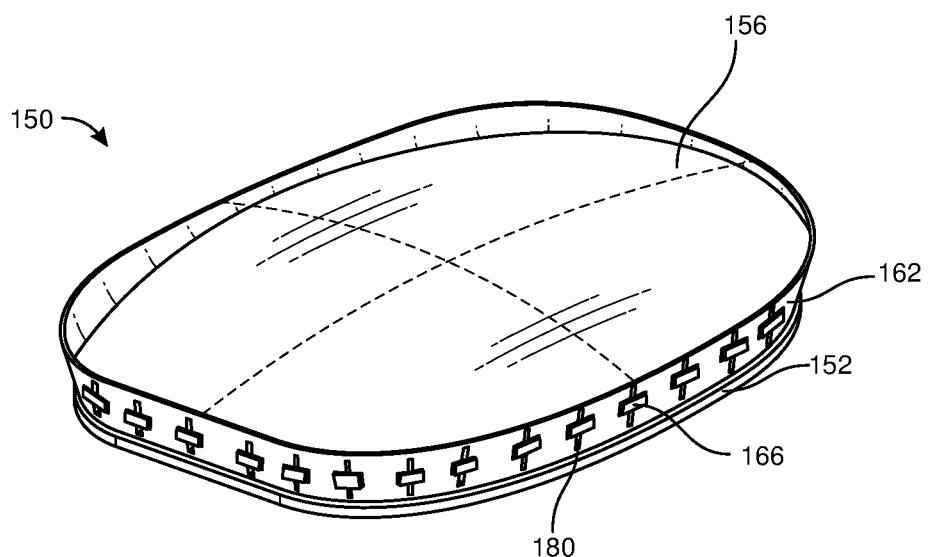

FIG. 1C shows a non-circular lens 150 that may otherwise be similar to the fluid lens 100 of FIG. 1B and may have a similar configuration. The non-circular lens 150 includes substrate 152, membrane 156, and support structure 162. The lens has a similar configuration of the membrane attachment 166, movable along a guide path defined by the guide slot 180. The profile of a guide path may be defined by the surface profile of the support structure 162, through which the guide slot is formed. The cross-section of the lens may be analogous to that of FIG. 1A. The dashed lines forming a cross on the membrane 156 are visual guides indicating a general exterior surface profile of the membrane 156. In this example, the membrane profile may correspond to a plano-convex lens.

FIGS. 2A-2D illustrate an ophthalmic device 200 including a fluid lens 202, according to some examples. FIG. 2A shows a portion of an ophthalmic device 200, which includes a portion of a peripheral structure 210 (which may include a guide wire or a support ring) supporting a fluid lens 202.

In some examples, the lens may be supported by a frame. An ophthalmic device (e.g., spectacles, goggles, eye protectors, visors, and the like) may include a pair of fluid lenses, and the frame may include components configured to support the ophthalmic device on the head of a user, for example, using components that interact with (e.g., rest on) the nose and/or ears of the user.

FIG. 2B shows a cross-section through the ophthalmic device 200, along A-A' as shown in FIG. 2A. The figure shows the peripheral structure 210 and the fluid lens 202. The fluid lens 202 includes a membrane 220, lens fluid 230, an edge seal 240, and a substrate 250. In this example, the substrate 250 includes a generally planar, rigid layer. The figure shows that the fluid lens may have a planar-planar configuration, which in some examples may be adjusted to a plano-concave and/or plano-convex lens configuration. The substrate 250 may, in some examples, include a non-planar optical surface of fixed optical power(s).

In some examples disclosed herein, one or both surfaces of the substrate may include a concave or convex surface, and in some examples the substrate may have a non-spherical surface such as a toroidal or freeform optical progressive or digressive surface. In various examples, the substrate may include a plano-concave, plano-convex, biconcave, biconvex, or concave-convex (meniscus) lens, or any other suitable optical element. In some examples, one or both surfaces of the substrate may be curved. For example, a fluid lens may be a meniscus lens having a substrate (e.g., a generally rigid substrate having a concave exterior substrate surface and a convex interior substrate surface), a lens fluid, and a convex membrane exterior profile. The interior surface of a substrate may be adjacent to the fluid, or adjacent to a coating layer in contact with the fluid.

FIG. 2C shows an exploded schematic of the device shown in FIG. 2B, in which corresponding elements have the same numbering as discussed above in relation to FIG. 2A. In this example, the edge seal is joined with a central seal portion 242 extending over the substrate 250.

In some examples, the central seal portion 242 and the edge seal 240 may be a unitary element. In other examples, the edge seal may be a separate element, and the central seal portion 242 may be omitted or replaced by a coating formed on the substrate. In some examples, a coating may be deposited on the interior surface of the seal portion and/or edge seal. In some examples, the lens fluid may be enclosed in a flexible enclosure (sometimes referred to as a bag) that may include an edge seal, a membrane, and a central seal portion. In some examples, the central seal portion may be adhered to a rigid substrate component and may be considered as part of the substrate. In some examples, the coating may be deposited on at least a portion of the enclosure surface (e.g., the interior surface of the enclosure). The enclosure may be provided, at least in part, by one or more of the following; a substrate, an edge seal, a membrane, a bag, or other lens component. The coating may be applied to at least a portion of the enclosure surface at any suitable stage of lens fabrication, for example, to one or more lens components (e.g., the interior surface of a substrate, membrane, edge seal, bag, or the like) before, during, or after lens assembly. For example, a coating may be formed before lens assembly (e.g., during or after fabrication of lens components); during lens assembly; after assembly of lens components but before introduction of the fluid to the enclosure; or by introduction of a fluid including a coating material into the enclosure. In some examples, a coating material (such as a coating precursor) may be included within the fluid introduced into the enclosure. The coating material may form a coating on at least a portion of the enclosure surface, where the enclosure surface may be adjacent or substantially adjacent the fluid.

FIG. 2D shows adjustment of the device configuration, for example, by adjustment of forces on the membrane using actuators (not shown). As shown, the device may be configured in a planar-convex fluid lens configuration. In an example plano-convex lens configuration, the membrane 220 tends to extend away from the substrate 250 in a central portion.

In some examples, the lens may also be configured in a planar-concave configuration, in which the membrane tends to curve inwardly towards the substrate in a central portion.

Figure 2E:
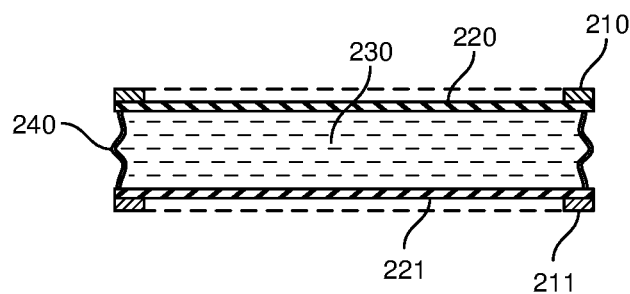

FIG. 2E illustrates a similar device to FIG. 2B, and element numbering is similar. However, in this example, the substrate 250 of the example of FIG. 2B is replaced by a second membrane 221, and there is a second peripheral structure (such as a second support ring) 211. In some examples disclosed herein, the membrane 220 and/or the second membrane 221 may be integrated with the edge seal 240.

Figure 2F:
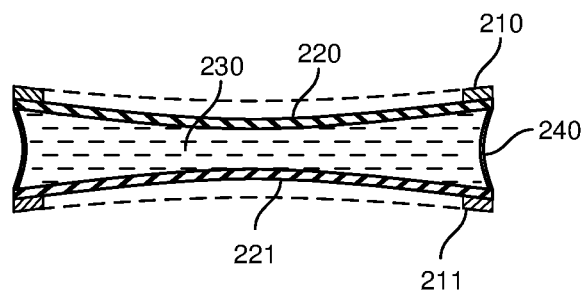

FIG. 2F shows the dual membrane fluid lens of FIG. 2E in a biconcave configuration. For example, application of negative pressure to the lens fluid 230 may be used to induce the biconcave configuration. In some examples, the membrane 220 and second membrane 221 may have similar properties, and the lens configuration may be generally symmetrical, for example, with the membrane and second membrane having similar radii of curvature (e.g., as a symmetric biconvex or biconcave lens). In some examples, the lens may have rotational symmetry about the optical axis of the lens, at least within a central portion of the membrane, or within a circular lens. In some examples, the properties of the two membranes may differ (e.g., in one or more of thickness, composition, membrane tension, or in any other relevant membrane parameter), and/or the radii of curvature may differ. In these examples, the membrane profiles have a negative curvature, that corresponds to a concave curvature. The membrane profile may relate to the external shape of the membrane. A negative curvature may have a central portion of the membrane closer to the optical center of the lens than a peripheral portion (e.g., as determined by radial distances from the center of the lens).

Figure 2G:
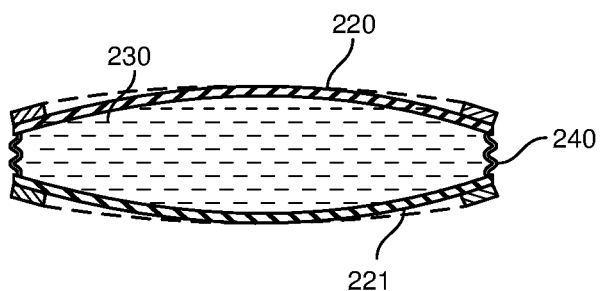

FIG. 2G shows the dual membrane fluid lens of FIG. 2E in a biconvex configuration, with corresponding element numbers.

In some examples, an ophthalmic device, such as an eyewear device, includes one or more fluid lenses. An example device includes at least one fluid lens supported by eyeglass frames. In some examples, an ophthalmic device may include an eyeglass frame, goggles, or any other frame or head-mounted structure to support one or more fluid lenses, such as a pair of fluid lenses.

Figure 3:
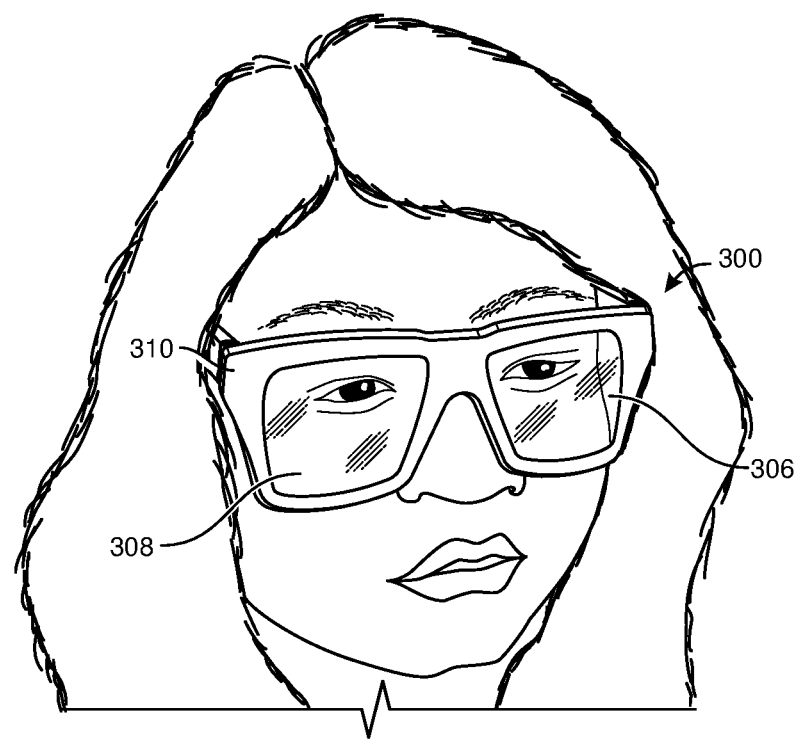
FIG. 3 illustrates an example ophthalmic device.

FIG. 3 illustrates an ophthalmic device, in this example an eyewear device, including a pair of fluid lenses, according to some examples. The eyewear device 300 may include a pair of fluid lenses (306 and 308) supported by a frame 310 (which may also be referred to as an eyeglass frame). The pair of fluid lenses 306 and 308 may be referred to as left and right lenses, respectively (from the viewpoint of the user).

In some examples, an eyewear device (such as eyewear device 300 in FIG. 3) may include an ophthalmic device (such as eyeglasses or spectacles), smart glasses, a virtual reality headset, an augmented reality device, a head-up device, visor, goggles, other eyewear, other device, or the like. In such eyewear devices, the fluid lenses 306, 308 may form the primary vision-correcting or adjusting lenses which are positioned in a user's field of view in use. An ophthalmic device may include fluid lenses that have an optical property (such as an optical power, astigmatism correction, cylindricity, or other optical property) corresponding to a prescription, for example, as determined by an eye examination. An optical property of the lens may be adjustable, for example, by a user or by an automated system. Adjustments to the optical property of a fluid lens may be based on the activity of a user, the distance to an observed article, or other parameter. In some examples, one or more optical properties of an eyewear device may be adjusted based on a user identity. For example, an optical property of one or more lenses within an AR and/or VR headset may be adjusted based on the identity of the user, which may be determined automatically (e.g., using a retinal scan) or by a user input.

In some examples, a device may include a frame (such as an eyeglass frame) that may include or otherwise support one or more of any of the following: a battery, a power supply or power supply connection, other refractive lenses (including additional fluid lenses), diffractive elements, displays, eye-tracking components and systems, motion tracking devices, gyroscopes, computing elements, health monitoring devices, cameras, and/or audio recording and/or playback devices (such as microphones and speakers). The frame may be configured to support the device on a head of the user.

Figure 4A:
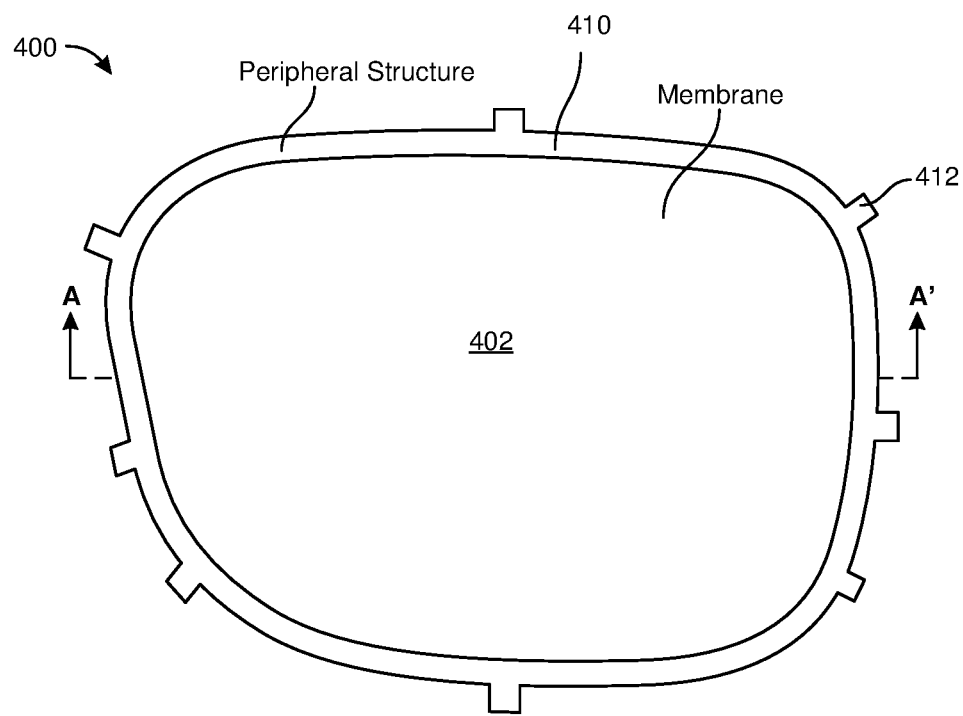
FIGS. 4A-4B illustrate an example fluid lens having a membrane assembly including a support ring.

FIG. 4A shows an example fluid lens 400 including a peripheral structure 410 that may generally surround a fluid lens 402. The peripheral structure 410 (in this example, a support ring) includes membrane attachments 412 that may correspond to the locations of control points for the membrane of the fluid lens 402. A membrane attachment may be an actuation point, where the lens may be actuated by displacement (e.g., by an actuator acting along the z-axis) or moved around a hinge point (e.g., where the position of the membrane attachment may be an approximately fixed distance "z" from the substrate). In some examples, the peripheral structure and hence the boundary of the membrane may flex freely between neighboring control points. Hinge points may be used in some examples to prevent bending of the peripheral structure (e.g., a support ring) into energetically favorable, but undesirable, shapes.

A rigid peripheral structure, such as a rigid support ring, may limit adjustment of the control points of the membrane. In some examples, such as a non-circular lens, a deformable or flexible peripheral structure, such as a guide wire or a flexible support ring, may be used.

Figure 4B:
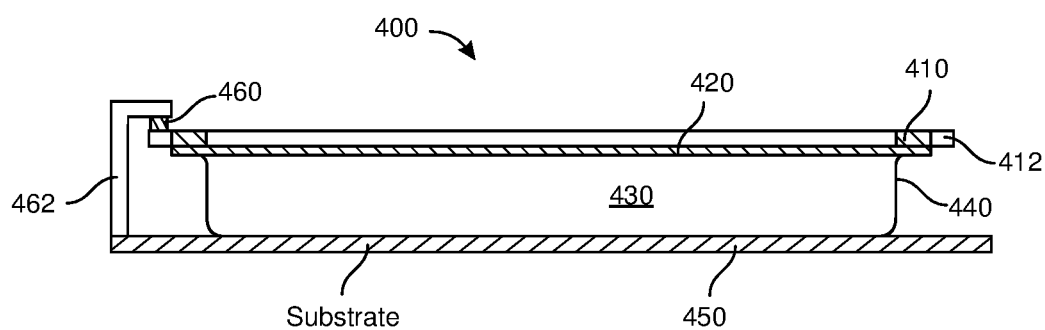

FIG. 4B shows a cross-section of the example fluid lens 400 (e.g., along A-A' as denoted in FIG. 4A). The fluid lens includes a membrane 420, fluid 430, edge seal 440, and substrate 450. The edge seal 440 may be flexible and/or collapsible. In some examples, the peripheral structure 410 may surround and be attached to the membrane 420 of the fluid lens 402. The peripheral structure may include membrane attachments 412 that may provide the control points for the membrane. The position of the membrane attachments (e.g., relative to a frame, substrate, or each other) may be adjusted using one or more actuators, and used to adjust, for example, the optical power of the lens. A membrane attachment having a position adjusted by an actuator may also be referred to as an actuation point, or a control point. Membrane attachments may also include non-actuation points, such as hinge points.

In some examples, an actuator 460 may be attached to actuator support 462, and the actuator may be used to vary the distance between the membrane attachment and the substrate, for example, by urging the membrane attachment along an associated guide path. In some examples, the actuator may be located on the opposite side of the membrane attachment from the substrate. In some examples, an actuator may be located so as to exert a generally radial force on the membrane attachment and/or support structure, for example, exerting a force to urge the membrane attachment towards or away from the center of the lens.

In some examples, one or more actuators may be attached to respective actuator supports. In some examples, an actuator support may be attached to one or more actuators. For example, an actuator support may include an arcuate, circular, or other shaped member along which actuators are located at intervals. Actuator supports may be attached to the substrate, or, in some examples, to another device component such as a frame. In some examples, the actuator may be located between the membrane attachment and the substrate, or may be located at another suitable location. In some examples, the force exerted by the actuator may be generally directed along a direction normal to the substrate, or along another direction, such as along a direction at a non-normal direction relative to the substrate. In some examples, at least a component of the force may be generally parallel to the substrate. The path of the membrane attachment may be based on the guide path, and in some examples the force applied by the actuator may have at least an appreciable component directed along the guide path.

Figure 5:
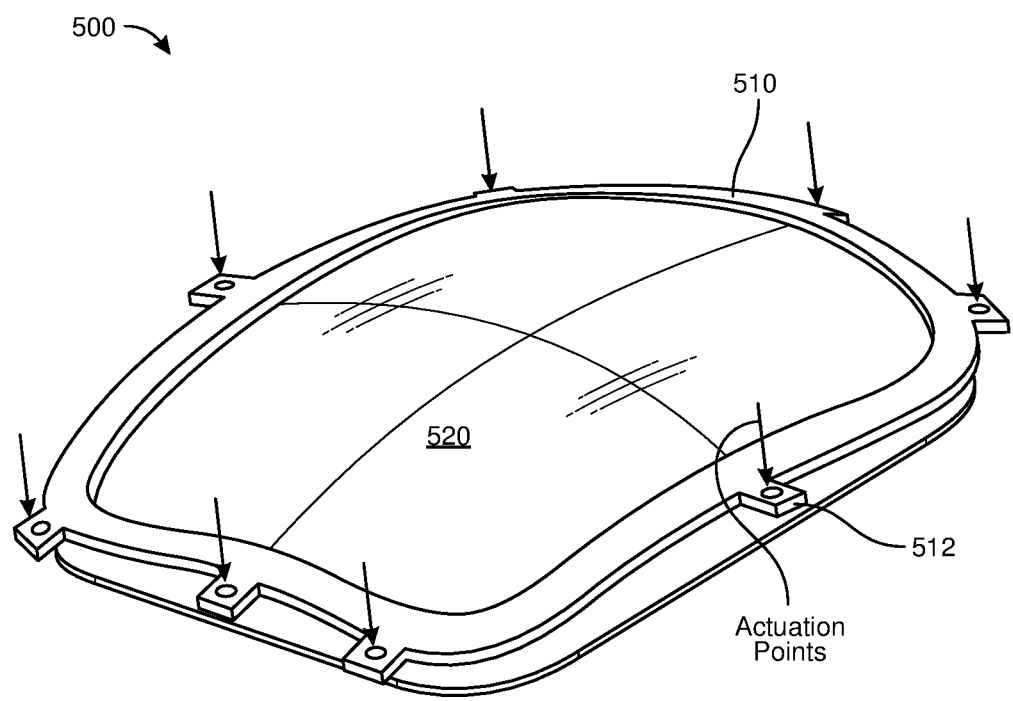
FIG. 5 illustrates deformation of a non-circular fluid lens, according to some embodiments.

FIG. 5 shows an example fluid lens 500 including a peripheral structure 510, here in the form of the support ring including a plurality of membrane attachments 512, and extending around the periphery of a membrane 520. Membrane attachments may include one or more actuation points and optionally one or more hinge points. The membrane attachments may include or interact with one or more support structures that each provide a guide path for an associated control point of the membrane 520. Actuation of the fluid lens may adjust the location of one or more control points of the membrane, for example, along the guide paths provided by the support structures. Actuation may be applied at discrete points on the peripheral structure, for example, the membrane attachments shown. In some examples, the peripheral structure may be flexible, for example, so that the peripheral structure may not be constrained to lie within a single plane.

In some examples, a fluid lens includes a membrane, a support structure, a substrate, and an edge seal. The support structure may be configured to provide a guide path for an edge portion of the membrane (such as a control point provided by a membrane attachment). An example membrane attachment may function as an interface device, configured to mechanically interconnect the membrane and the support structure, and may allow the membrane to exert an elastic force on the support structure. A membrane attachment may be configured to allow the control point of the membrane (that may be located in an edge portion of the membrane) to move freely along the guide path.

An adjustable fluid lens may be configured so that adjustment of the membrane profile (e.g., an adjustment of the membrane curvature) may result in no appreciable change in the elastic energy of the membrane, while allowing modification of an optical property of the lens (e.g., a focal length adjustment). This configuration may be termed a "zero-strain" device configuration as, in some examples, adjustment of at least one membrane edge portion, such as at least one control point, along a respective guide path does not appreciably change the strain energy of the membrane. In some examples, a "zero-strain" device configuration may reduce the actuation force required by an order of magnitude when compared with a conventional support beam type configuration. A conventional fluid lens may, for example, require an actuation force that is greater than 1N for an actuation distance of 1 mm. Using a "zero-strain" device configuration, actuation forces may be 0.1N or less for an actuation of 1 mm, for quasi-static actuation. This substantial reduction of actuation forces may enable the use of smaller, more speed-efficient actuators in fluid lenses, resulting in a more compact and efficient form factor. In such examples, in a "zero-strain" device configuration, the membrane may actually be under appreciable strain, but the total strain energy in the membrane may not change appreciably as the lens is adjusted. This may advantageously greatly reduce the force used to adjust the fluid lens.

In some examples, a fluid lens may be configured to have one or both of the following features: in some examples, the strain energy in the membrane is approximately equal for all actuation states; and in some examples, the force reaction at the membrane edge is normal to the guide path. Hence, in some examples, the strain energy of the membrane may be approximately independent of the optical power of the lens. In some examples, the force reaction at the membrane edge is normal to the guide path, for some or all locations on the guide path.

In some examples, movement of the edge portion of the membrane along the guide path may not result in an appreciable change in the elastic energy of the membrane. This configuration may be termed a "zero-strain" guide path as, in some examples, adjustment of the membrane edge portion along the guide path does not appreciably change the strain energy of the membrane.

Fluid lenses are useful in a variety of applications. Improvements in the performance of fluid lenses would, therefore, be of value in such applications. Embodiments of the present disclosure may be directed to fluid lenses, membranes used in fluid lenses, membrane assemblies, and improved devices using fluid lenses, such as eyewear devices. Eyewear devices may include spectacles, sunglasses, eye protection devices, augmented reality devices, virtual reality devices, and the like. Suitably, the fluid lenses of the present disclosure may be used as principal lenses in eyewear. As described herein, such lenses may be positioned in front of a user's eyes so the user looks through the lens at objects or images to be viewed. The lenses may be configured for vision correction or manipulation as described herein. Embodiments of the present disclosure may include fluid lenses including a lens fluid having a gas content, or reduced Henry law gas solubility, which may be controlled (e.g., reduced) to reduce the likelihood of bubble formation in the lens fluid.

Adjustable fluid lenses are useful for ophthalmic, virtual reality (VR), and augmented reality (AR) devices. In some example AR and/or VR devices, one or more fluid lenses may be used for the correction of what is commonly known as the vergence accommodation conflict (VAC). Examples described herein may include such devices, including fluid lenses for the correction of VAC. Examples disclosed herein may also include fluid lenses, membrane assemblies (which may include a membrane and, e.g., a peripheral structure such as a support ring or a peripheral guide wire), and devices including one or more fluid lenses.

The lens fluid, which may for conciseness also be referred to as the fluid, may be formulated to include an additive, or the additive may be included in the lens fluid at a later stage. For example, the fluid may include a liquid and an additive. The liquid may include, for example, a silicone oil. The additive may include nanoparticles, an additional fluid component, a solute dissolved in the liquid, or other suitable material. to form the lens fluid. The fluid may include an amount of an additive that is effective to appreciably to reduce bubble formation within the fluid. For example, the additive may reduce the number of bubbles that form in the fluid by at least a factor of 2 (number of bubbles halved), and in some examples by at least a factor of 3, compared to the number of bubbles in an otherwise similar fluid without the additive.

In some examples, nucleation sites may be deliberately introduced in contact with the lens fluid. In some examples, a coating may be located between the lens fluid and the interior surface of the enclosure (which may include interior surfaces of the membrane and/or substrate), and the coating may provide an arrangement of nucleation sites.

Typically, when a fluid is subjected to negative gage pressure and there are dissolved gases within (e.g., saturating) the fluid, there is a tendency for bubbles (e.g., including fluid vapor and dissolved gases) to form within the fluid. This may be an issue in fluid-filled adjustable lenses (which may be referred to herein, more concisely, as fluid lenses). For example, when the lens fluid experiences a negative gage pressure, bubbles may form in the fluid, and may degrade both aesthetics and optical properties of the fluid lens. A negative gage pressure may be applied to a fluid lens to obtain a concave membrane configuration. Hence, one approach to avoiding bubble formation is to avoid concave membrane configurations. However, this may reduce the range of optical powers available to a fluid lens.

In some examples, fluid lenses are described having aspects that reduce or substantially prevent the formation of gas bubbles in the lens fluid (e.g., a silicone oil) when the lens fluid is subjected to a negative gage pressure.

Example embodiments of the present disclosure may include a lens fluid having one or more additives included to increase the cohesive energy density of the lens fluid. In some examples, the one or more additives may include a thixotropic agent. An example thixotropic agent may have one or more (e.g., all) of the following aspects: hydrophobic, non-polar, transparent, and/or a high index of refraction (e.g., n>1.45). An example thixotropic agent may impart an appreciable thixotropic effect to the lens fluid, which may then be termed a thixotropic fluid (or a thixotropic lens fluid). For example, by increasing the cohesive energy density of the lens fluid, the Hildebrand solubility parameter may be increased, and the gas solubility may decrease. In some examples, the cohesive energy density may be increased by including an additive, such as an additive including particles, such as nanoparticles. An example additive may include a thixotropic agent that helps to impart an appreciable thixotropic property to the fluid, for example, a flow-induced viscosity reduction such as shear thinning.

In some examples, a fluid lens may include silica nanoparticles as an additive to the lens fluid. Suitably, the silica nanoparticles may include fumed silica. The nanoparticles may be chemically modified, as described in more detail below. In this context, a nanoparticle may have a sub-micron size parameter, such as a diameter (or similar size parameter) that is less than about one micron. In some examples, particles may have a diameter (or similar size parameter) of approximately 100 nm, or less. In some embodiments the nanoparticles may have a size of about 1 nm or more, and optionally about 10 nm or more. In some examples, the particles may be nanoparticles having a diameter (or similar size parameter) of between approximately 1 nm and approximately 1 micron, such as between 1 nm and 500 nm, such as between 5 nm and 200 nm, such as between 5 nm and 50 nm. Particle dimensions may be an average, such as a mean, median, or mode value (e.g., the peak of a size distribution).

In some examples, a lens fluid may include one or more thixotropic additives, and may then be termed a thixotropic fluid. In this context, the term thixotropic may refer to materials which exhibit flow rate dependent shear thinning. For example, the viscosity may appreciably reduce under applied stress. However, when at rest, intermolecular forces may organize the material into a higher viscosity form, or a gel state. A thixotropic additive may impart thixotropic properties to a fluid of which it is a component, and the fluid may then be termed a thixotropic fluid. The thixotropic effect may allow faster optical power adjustment of the lens, for example, by reducing the viscosity of the fluid during an adjustment of the lens. For example, actuation of the lens may induce fluid flow, and the fluid flow may then reduce the viscosity of the fluid due to the thixotropic effect, and this reduction in viscosity may then reduce the response time of the lens. In this context, the term thixotropic may refer to shear thinning, and/or other changes in fluid viscosity related to fluid motion. The viscosity changes of the fluid may occur on a timescale fast enough to be not noticeable by a user.

In some examples, use of a thixotropic fluid in a fluid lens may improve the mechanical stability of the lens under normal use, while allowing an adjustment of the lens to be made in a time less than that possible using a non-thixotropic high viscosity lens fluid. For example, the effective viscosity of the fluid may be relatively high between adjustments of the fluid lens, and relatively low during adjustments.

In some examples, the time dependence of the thixotropic effect may not be of great significance, but may be fast enough to allow optical power adjustment of a lens in a reasonable time. In this context, the term thixotropic may also refer to shear thinning, and other changes in viscosity, even if the time dependence is not noticeable by a user.

In some examples, particles (e.g., microparticles and/or nanoparticles) may be included in the lens fluid, for example, as a suspension of particles in a liquid. Example particles may include silica particles. Silica particles may include hydrophobic particles, such as hydrophobic fumed silica particles, for example, pyrogenically formed silica particles that have hydrophobic chemical groups bonded to the surface. Other example particles may include precipitated silica, glass particles, or silica particles formed by any suitable process. Suitable hydrophobic groups may include hydrocarbons, such as alkyl or alkyl silane or siloxane groups. Silica may also be referred to as silicon dioxide, though embodiments are not limited to exact compositions such as $SiO_2$.

FIG. 6 illustrates a lens fluid including a plurality of particles. The figure shows the lens fluid in an agitated state 602 on the left-hand side of the figure. The lens fluid in the agitated state 602 includes a plurality of particles 604. There may be some aggregation of particles, such as particle aggregate 606, in which a plurality of particles are aggregated together. However, in the agitated state (which may correspond to the fluid during adjustment of the lens, which may also be termed actuation of the lens) the particle may be at least partially or, in some examples, mostly non-aggregated. The average particle size of the aggregates may be appreciably less in an agitated state, for example, where an agitated state includes an appreciable flow.

FIG. 6 also shows the lens fluid in a resting state 610 on the right-hand side of the figure, where particle aggregation (e.g., such as the aggregation of particle 612 with adjacent particle 614) is more extensive than in the agitated state 602 shown on the left-hand side of the figure. In the resting state, particle aggregates (such as particle aggregate 616, including a plurality of particles aggregated together) may be generally larger.

The varying degrees of particle aggregation may lead to thixotropic properties, such as a viscosity that is dependent on the flow or shear flow properties of the fluid. In some examples, the viscosity of the fluid may be appreciably higher in the resting state than in the agitated state. For example, the fluid viscosity in the resting state may be at least 25% higher than the fluid viscosity in the agitated state, other factors such as temperature being equal. The particles may form particle assemblies when the fluid is at rest, such as particle chains and/or particle networks, which may be readily broken apart on disturbance of the fluid, such as during fluid flow during actuation of a lens.

In some examples, the lens fluid may include 1,3,5-trimethyl-1,1,3,5,5-pentaphenyltrisiloxane, and FIG. 6 shows example chemical structures 608 for illustrative purposes only. Other lens fluids may be used, and embodiments are not limited to any particular composition of the lens fluid or component thereof. In some examples, the fluid viscosity may be appreciably greater in the resting state (e.g., due to formation of particle aggregates), then appreciably reduce under agitation of the fluid (here, agitation may include flow or other shear inputs) due to the disruption or break-up of the particle aggregates. A thixotropic property may include a reduction in viscosity under mechanical input, such as flow, agitation, and the like. The fluid density may not change on agitation, but the degree of particle aggregation and fluid viscosity may both be appreciably reduced.

In some examples, the formation of particle aggregates may appreciably increase the viscosity of the lens fluid. Agitation of the fluid (or other mechanical input) may reduce the degree of aggregation, and/or the average aggregate size, reducing the viscosity of the fluid. The viscosity decrease under agitation may be referred to as a thixotropic property, and may result from interactions between the particles. Particle interactions may lead to the formation of particle aggregates, and disruption of particle aggregates (e.g., under agitation) may reduce the viscosity of the fluid. In some examples, the viscosity of the lens fluid may be increased by at least 10%, for example, by at least 20%, by the inclusion of an additive such as particles. The increase in viscosity may be for the fluid in a rest state (e.g., a non-agitated, non-flow state), and may be relative to a similar lens fluid without the additive under similar conditions.

In some examples, an additive may impart appreciable thixotropic properties to the lens fluid. Thixotropic materials exhibit rate-dependent shear thinning, and may have a viscosity that is appreciably reduced under applied stress. When at rest, intermolecular forces may organize the bulk material into a high viscosity or gel state, for example, based on intermolecular interactions of molecules, and/or particle aggregation. Gases may enter the lens fluid, for example, during a mixing process, absorption from the atmosphere, or through molecular diffusion from one surface to another (e.g., through the membrane). In some examples, the level of gas solubility in a lens fluid may be predicted by the Hildebrand solubility parameter. In some examples, the lens fluid may include an additive such as a thixotropic particle of the kind described herein that may reduce the level of gas solubility in the lens fluid. The additive may increase the viscosity of the fluid, but viscosity of the fluid may be reduced during actuation of the lens. The flow-dependent reduction in viscosity may be due to thixotropic properties of the fluid, which may result from the flow-induced breaking apart of particle and/or molecular assemblies during actuation of the lens, for example, due to flow effects such as shear thinning.

As detailed above, example embodiments described herein may include fluid lenses, including a lens fluid (sometimes referred to herein more concisely as a "fluid") having a reduced gas content. In some examples, a lens fluid includes an additive that reduces gas solubility compared to a fluid without the additive under similar conditions. In some examples, an additive may affect a reduction of gas absorption by a lens fluid, such as a silicone oil, by increasing the cohesivity of the fluid. In some examples, this may be achieved using the introduction of a thixotropic additive. In this context, a thixotropic additive may induce thixotropic properties in the fluid when the thixotropic additive is added to the fluid. A reduction in the gas absorption of the lens fluid may reduce cavitation and nucleation of bubbles, for example, when the fluid is subject to a negative pressure change. The term cavitation may refer to the formation of vapor or gas cavities in a fluid, such as bubbles, for example, caused by negative pressure and/or temperature cycling applied to the lens fluid.

A lens fluid may include a liquid, for example, as a component of a suspension of nanoparticles, colloid, gel, or other phase. Gas stability in a liquid is now considered, and the conclusions are applicable to lens fluids as described herein.

The Hildebrand solubility parameter is a numerical value that may be used to predict the level of interaction between materials. For example, this parameter may provide an indication of solubility. The heat of vaporization refers to the amount of energy required to transform a liquid into a gas.

The Hildebrand solubility parameter describes the cohesive energy density (i.e., total van der Waal forces) of a substance using a numerical value. The cohesive energy density of a material (c) is derived from the heat of vaporization ($\Delta H$), which shows how much energy is needed to separate molecules:

$$c = \frac{\Delta H - RT}{V_m} \quad \text{(Equation 1)}$$

where c is the cohesive energy density, $\Delta H$ is the heat of vaporization, R is the gas constant, T is the temperature, and $V_m$ is the molar volume.

The Hildebrand solubility parameter ($\delta$) may be derived from the following expression:

$$\delta = \sqrt{c} = \left[\frac{\Delta H - RT}{V_m}\right]^{1/2} \quad \text{(Equation 2)}$$

When considering solubility based on Hildebrand solubility values, materials having similar intermolecular forces acting on them may be more likely to be soluble in the other. This may be seen, for example, when comparing Hildebrand solubility values for oils and air.

For example, when He (helium) and $N_2$ (nitrogen) are tested for solubility in silicone oil, the solubility of He is less than that of $N_2$. This relationship holds true for polyolefin oil, with the difference being that the solubility of the two gases is greater in silicone oil than in polyolefin. These solubility relationships may be explained by comparing Hildebrand solubility parameters.

There may be a direct relationship between the Hildebrand solubility value of a gas and its solubility in a liquid, which is based on its proximity to the Hildebrand solubility value of the liquid. In one example, the potential for cavitation in silicone oil may be reduced by reducing the amount of dissolved gases. This may be accomplished, for example, by increasing the oil's Hildebrand solubility value. In some examples, the intramolecular attractive forces added to the bulk fluid by the addition of particles, such as hydrophobic fumed silica, may increase the oil's Hildebrand solubility value.

The stability of a bubble in the lens fluid is now discussed. Consider a bubble of radius r in a liquid of pressure p. Let the liquid surface tension be $\gamma$, the temperature be T, and the vapor pressure be $p_v$, and let the pressure due to the $n_m$ moles of non-condensable gas in the bubble be $p_g$. If the pressures inside and outside of the bubble are in balance, then the pressure balance equation is:

$$\frac{3n_m RT}{4\pi r^3} + p_v = p + \frac{2\gamma}{r} \quad \text{(Equation 3)}$$

The first term on the left-hand side is $p_g$ from the ideal gas equation, R being the gas constant, and the second term on the right-hand side is from the Young-Laplace equation for pressure change across the surface tension (e.g., at the bubble boundary having a radius r). The pressure inside the bubble $p_g + p_v$, is larger than that within the fluid outside the bubble, due to the surface tension.

FIG. 7 shows the Young-Laplace pressure as a function of bubble radius for different liquids, where $\gamma$ is expressed in mN/m. Liquids include a silicone oil (Si oil), polyphenyl ether (PPE), and water. A minimum stable bubble size (or bubble radius), below which the Young-Laplace pressure causes the gas to re-dissolve under a negative gage pressure, is given by:

$$r_{min} = R_m \frac{\gamma}{F_L} \quad \text{(Equation 4)}$$

This is equivalent to where the liquid gage pressure meets the Young-Laplace pressure, for example, as illustrated in FIG. 7.

A larger minimum bubble size suggests that a bubble is less likely to form. For a low membrane pressure which acts to reduce the fluid pressure, this predicts a large minimum bubble size.

Bubble formation may be driven by the difference in dissolved gas concentration between atmospheric pressure (which may also be termed ambient pressure) and fluid pressure. A negative pressure may correspond to the fluid pressure being less than the atmospheric pressure. The total quantity of gas dissolved in the fluid may be less than that required to reach the minimum stable size bubble. In that case, the fluid lens may be stable against bubble formation.

In some lens configurations, a negative pressure may be associated with the membrane being drawn in towards the substrate to provide a concave exterior surface of the fluid lens, which may also be referred to as a negative curvature. A negative curvature may be associated with negative optical powers (e.g., a diverging lens).

The membrane line tension that allows such a condition to be achieved, in a fluid lens of given optical power with its membrane in a concave configuration, may now be determined. Let the refractive index of the fluid be n and the optical power be $\phi = (n-1)/R_m$. The magnitude of the gage pressure in the lens is $\Delta p = 2F_L/R_m$. The (negative) gage pressure and minimum bubble radius are given respectively by:

$$\Delta p = \frac{2F_L \Phi}{n-1}; r_{min} = \frac{2\gamma}{\Delta p} \quad \text{(Equations 5A and 5B)}$$

Approximating Henry's law for air to a single-species equation $c_g = H^{cp} p$, where $c_g$ is the gas concentration and $H^{cp}$ is Henry's solubility constant, then the number of moles of gas available to form a bubble in a lens of volume $V_l$ is:

$$n_m = \Delta c_g V_l = H^{cp} \Delta p V_l \quad \text{(Equation 6)}$$

Substituting into the pressure balance equation using $p = p_{atm} - \Delta p$ and rearranging, we get the maximum line tension that allows for a stable lens. Suppose all the dissolved gas associated with the pressure difference across the membrane came out of solution into a single bubble. If that bubble is too small to overcome the liquid surface tension, then the lens may be considered to be stable. The maximum line tension is:

$$F_{Lmax} = \frac{(n-1)}{\Phi} \left\{ \frac{2\pi \gamma^3 (p_{atm} - p_v)}{3 R T H^{cp} V_l} \right\}^{\frac{1}{4}} \quad \text{(Equation 7)}$$

Assuming the dimensions and optical power requirements of a typical ophthalmic lens operating at room temperature, with a membrane tension above about 200 N/m (e.g., to reduce gravity sag), then gas solubility for absolute stability may correspond to a Henry's solubility constant of less than about $10^{-6}$ mol·m$^{-3}$·Pa$^{-1}$.

Hence, in some examples, the fluid lens may include lens fluid having "absolute stability", in that there is insufficient gas dissolved in the lens fluid to form a stable bubble during operation of the lens.

In some examples, lens fluid may be absolutely stable to bubble formation, for example, due to the presence of an additive to the lens fluid that increases the cohesive energy density and reduces the amount of dissolved gas present in the lens fluid.

In some examples, the amount of dissolved gas may be less than that required to form a stable bubble, even if all the gas dissolved in the lens fluid were to form a single bubble. Any bubble that formed in the lens fluid would then be unstable, so that the gas would re-dissolve in the lens fluid. As discussed further above, a fluid lens with lens fluid meeting this condition may be termed a fluid lens with absolute stability against bubble formation.

In some examples, the lens fluid has "practical stability", in that a stable bubble is very unlikely to form in the lens fluid. In some examples, a fluid lens includes a lens fluid in which the gas solubility in the fluid has been modified by an additive so that that bubble formation is unlikely, for example, meeting a predetermined quality standard for a product that would not otherwise be achieved. For example, less than one bubble (on average) may form in an example lens under negative gage pressure. The additive may act as a cohesive energy increasing agent, increasing the cohesive energy of the lens fluid. A fluid lens with "practical stability" may have a failure rate due to bubble formation that is low enough to be neglected.

In some examples, the lens fluid may have nucleation stability, where there may be sufficient nucleation sites for bubble formation such that there is not enough dissolved gas (e.g., per nucleation site) for stable bubbles to form. In other words, there may be sufficient nucleation points so that any bubbles that do form are unstable (e.g., based on the available dissolved gas in fluid sub-volumes associated with each nucleation point). For instance, given a surface tension for the fluid of about 0.01-0.1 N/m, a membrane line tension of about 200-400 N/m, and a high power radius of curvature of an ophthalmic membrane of about, for example, 150 mm (e.g., 4 diopters at 1.6 refractive index), in some embodiments the minimum stable bubble size (e.g., bubble radius) may be between about 3.75 μm and 75 μm. Thus, in some embodiments, a sufficient number of nucleation sites may be provided so that the maximum size (e.g., radius) of each bubble is below about 3 μm, thereby encouraging a situation in which each bubble collapses under its own surface tension. Using this general approach, the number of nucleation sites may be effective to appreciably reduce bubble formation within the fluid. For example, the volume of fluid associated with each nucleation site may be less than the volume of a stable bubble within the fluid.

Figure 8A:
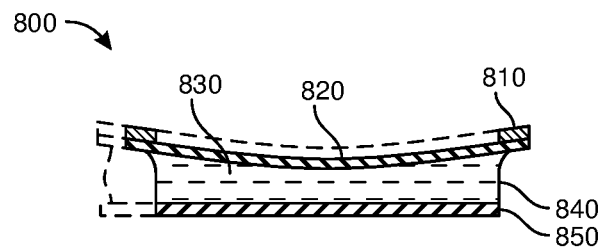
FIGS. 8A-8D illustrate gas bubble nucleation within an example lens fluid.

FIG. 8A shows an example fluid lens 800 in a plano-concave configuration. The fluid lens includes a peripheral structure 810, membrane 820, lens fluid 830, edge seal 840, and substrate 850.

Figure 8B:
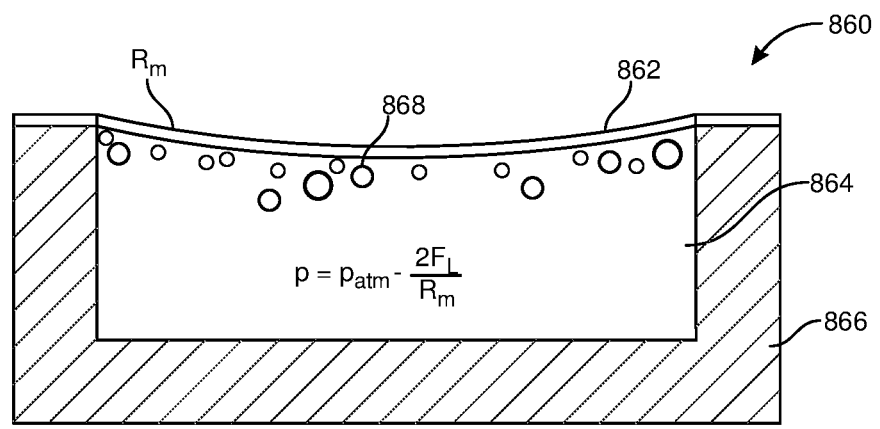

FIG. 8B is a simplified schematic representation of a fluid lens 860, including membrane 862 with radius of curvature $R_m$, lens fluid 864, and rigid enclosure 866. This figure may be a simplified representation of the lens of FIG. 8A. The deformation of the edge seal 840 in FIG. 8A may be neglected in the analysis of lens properties, so that the combination of substrate 850 (which may be a rigid substrate) and edge seal 840 may be reasonably approximated by the rigid enclosure 866. The edge seal may be flexible, but fluid volume changes due to the deformation of the edge seal may be neglected in certain analyses. The membrane line tension and radius of curvature may be denoted $F_L$ and $R_m$ respectively. The membrane is in a concave configuration, indicating that the pressure of the lens fluid is below atmospheric pressure. In this configuration, the lens may suffer from cavitation, and bubbles may form at nucleation sites 868. The pressure inside the fluid may be estimated to be the atmospheric pressure (or other ambient pressure outside the lens) plus the negative gage pressure that induces the concave membrane profile shown (which is equal to $2F_L/R_m$). The pressure inside the fluid may be given by $p = p_{atm} - (2F_L/R_m)$, as shown.

Figure 8C:
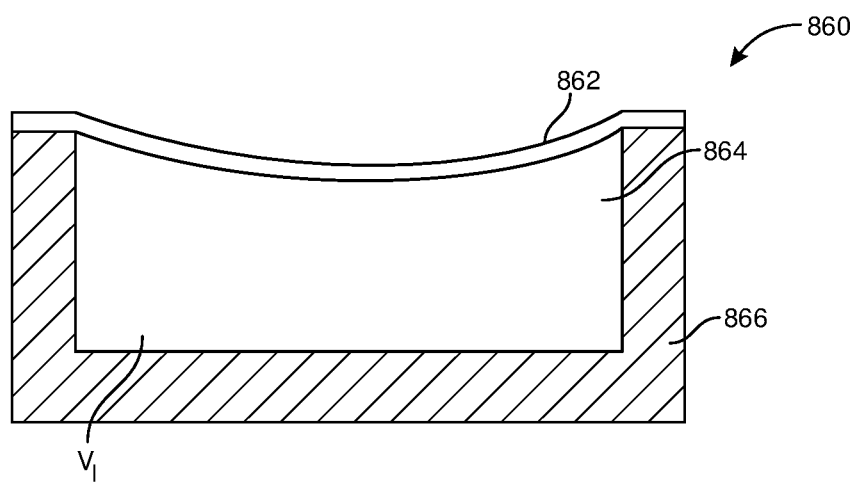

FIG. 8C represents a schematic of the fluid lens 860, including a membrane 862, a volume $V_l$ including lens fluid 864, and a rigid enclosure 866, but without cavitation and the formation of bubbles. In some examples, this may be achieved by including an additive, such as a thixotropic agent, within the lens fluid. As discussed above, the fluid lens may be configured with absolute or practical stability.

Figure 8D:
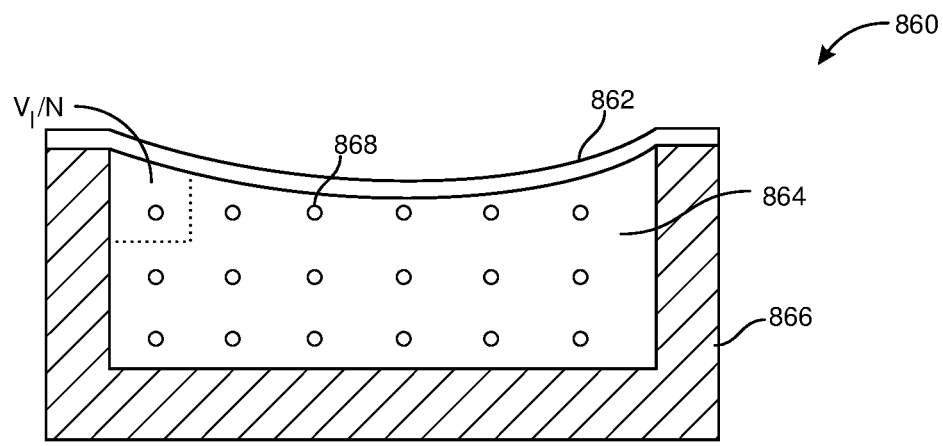

FIG. 8D shows a fluid lens including additional nucleation centers. The figure shows the fluid lens 860 (with a configuration as discussed above in relation to FIG. 8B) that further includes N evenly spaced nucleation sites 868, so that the volume of fluid surrounding each nucleation site may be estimated as $V_l/N$. If this sub-volume is small enough to satisfy a local absolute stability condition, and neighboring bubbles collapse before they amalgamate into a stable large bubble, then the lens may be considered as "nucleation stabilized" against bubble formation.

In some examples, the interior surface of a substrate and/or membrane may include an arrangement of nucleation sites, for example, such that the dissolved gas in a volume of lens fluid associated with each nucleation site is insufficient to form a stable bubble in the lens fluid. For example, the interior surface of a substrate and/or membrane may be processed using, for example, mechanical abrasion, scribing, mechanical indentation, laser scoring, or other process to provide nucleation sites. An improved substrate and/or membrane, or assembly thereof, may include an arrangement of nucleation sites, such as described herein.

In some examples, at least part of the interior surface of the enclosure may have a coating that reduces, substantially eliminates, or in some examples, appreciably increases the number of nucleation sites for formation of bubbles in the lens fluid. The coating may be located between the lens fluid and the interior surface of the enclosure (which may include interior surfaces of the membrane and/or substrate). In some examples, the coating may be configured to increase the number of nucleation sites, for example, by including surface features (such as surface protrusions or surface depressions), particles, and the like. An increased number of nucleation sites may reduce the possibility of a nucleated bubble growing to a stable diameter, by reducing the fluid volume (and hence amount of dissolved gas) per nucleation site.

The nucleation sites may be evenly spaced, and, in some examples, may be unevenly spaced provided that the local volume of fluid around each nucleation site is sufficiently small and therefore dissolves sufficiently little gas to ensure the absolute stability condition described above is satisfied.

Nucleation sites 868 may include nucleation particles or one or more similar nucleation structures dispersed or distributed through the lens fluid. In some examples, the nucleation structures may each have a sub-wavelength dimension (e.g., a diameter or similar dimension that is less than approximately 0.25 microns, preferably less than about 0.1 microns). Example nucleation sites 868 may have characteristics that prevent or reduce aggregation (e.g., clumping together) of nucleation structures, such as the aggregation of nucleation particles. For example, prevention of nucleation structure aggregation may reduce or prevent the formation of wavelength sized (or larger) aggregations, which may lead to cloudiness if allowed to form. Prevention of nucleation structure aggregation may also help maintain a sufficiently small sub-volume around each individual nucleation site (e.g., which may be estimated as approximately $V_f/N$) to prevent or reduce bubble formation.

FIG. 9 illustrates an example method 900, for example, of fabricating a fluid lens having reduced bubble formation. The method 900 includes fabricating a fluid lens assembly including a substrate and a flexible membrane, and having an interior enclosure (910), where the interior enclosure is at least partially enclosed by the substrate and the membrane. The example method further includes preparing a lens fluid including an additive (e.g., a thixotropic agent) (920), and introducing the lens fluid into the enclosure to form the fluid lens (930). The additive may increase the cohesive energy of the lens fluid when the additive is a component of the lens fluid. In some examples, the additive may include particles, such as nanoparticles, for example, silica nanoparticles.

FIG. 10 illustrates an example method 1000, for example, of fabricating a fluid lens. The method includes fabricating a fluid lens assembly including a substrate, a flexible membrane, and an interior enclosure having a plurality of nucleation sites (1010), where the interior enclosure is at least partially enclosed by the substrate and the membrane, preparing a lens fluid including an additive (e.g., a thixotropic agent) (1020), and introducing the lens fluid into the enclosure to form the fluid lens (1030). In some examples, the plurality of nucleation sites may include an arrangement of nucleation structures disposed on the substrate. Nucleation structures may include pillars, pits, scratches, particles, and the like.

In experimental evaluations, using degassed silicone oil samples including a silica-based additive, the oxygen ($O_2$) content was monitored over a time period of 1 month. No significant oxygen reduction was noted with the additive at low concentrations, for example, below 0.5%. A reduction of 20% in dissolved oxygen was achieved using fumed silica (e.g., Aerosil fumed silica) at a concentration of approximately 2% in a silicon oil. The fluid had an elevated viscosity, and was slightly hazy. Transparency may be improved using an improved mixing process, for example, using higher temperature mixing (e.g., under pressure), improved agitation, and/or modified particle surface functionality. Reduced particle diameters may also reduce haze, for example, using particle diameters for which the medium appears clear with a refractive index that may be determined by an effective medium approximation. In some examples, the average particle diameter may be less than approximately 200 nm, for example, in the range 1 nm-200 nm. Another sample batch was prepared using fumed silica (e.g., Aerosil R812S 0.1). Concentrations of 2% and 5% were prepared without vacuum degassing, showing a similar oxygen concentration reduction. A sample with 5% fumed silica (by weight) in a silicon oil showed a remarkable 50-55% reduction in oxygen concentration. A 10% concentration of fumed silica was found to be over the limit for a fluid particle suspension. Additive and oxygen concentrations may be determined as a weight/weight percentage.

In some examples, the amount of particles within the fluid may be in the range of 0.5%-8%, for example, in the range 1%-5%, such as between 2% and 5% (e.g., as a weight/weight percentage, e.g., the weight of particles divided by the weight of fluid in which the particles are suspended or otherwise located). In some examples, the amount of particles may be sufficient to appreciably enhance the cohesive energy of the fluid. In some examples, the amount of particles may be sufficient to appreciably reduce gas solubility (e.g., of oxygen, nitrogen, air, or other dissolved gas) within the fluid. The amount of particles may be less than that which induces gelation of the fluid, or less than the maximum suspension amount. A lens fluid may include, for example, between 90% and 99.5% of one or more silicone oils, and the remainder as an additive that may include particles.

Particles, such as silica particles, may have a surface modified with one or more organosilicon species, such as an organosilane, for example, hexamethyldisilazane (HMDS). These particles may also include nanoparticles, in some examples.

In some examples, there may be other possible advantages that may be obtained using nanoparticles. For example, a high viscosity fluid or gel may provide additional resistance to shock or vibration-induced instabilities in a fluid lens, which may, for example, be useful in environments with high vibrational disturbances. Focal length adjustment may be slower using a higher viscosity lens fluid, but increased mechanical stability may, in some applications, outweigh such an issue. In some examples, fluid lens focal adjustments may be performed in a higher temperature environment than some use cases, or may take advantage of thixotropic effects.

In some examples, a lens fluid may include one or more additives selected to increase the cohesive energy of the lens fluid, for example, to reduce gas solubility. Example additives may include particles having a diameter or other analogous dimension of less than 1 micron, preferably less than 0.5 microns. Such particles may be termed nanoparticles. In some examples, particles may include silica particles, such as silica nanoparticles. In some examples, particles may include microparticles, such as microparticles having a diameter between approximately 1 micron and approximately 200 microns. In some examples, particles may have a modified surface, such as a particle surface including one or more of surface groups, such as surface functional groups (e.g., silane groups, such as organosilanes), adsorbed molecules, a surface coating, an outer shell layer, or the like. The use of such particles, including surface-modified particles, may appreciably enhance the cohesive energy of the fluid, reduce gas solubility, and help prevent bubble formation in fluid lenses. Surface groups may impart hydrophobic properties to the particles. Surface groups may also be used to enhance the amount of particles that may be suspended in the fluid. For example, for a suspension in a silicone oil, the surface groups may include silicon-containing groups. For example, for a suspension in a hydrophobic liquid, the surface groups may include hydrophobic groups.

Fluid components may include molecules (which may include functional groups) that may interact with other fluid components, such as other additive components, or with the (unmodified) lens fluid. Interactions may include, for example, van der Waals forces, hydrogen bonds, dipolar interactions, or other interactions. In some examples, particles, may aggregate through one or more inter-particle forces, such as of van der Waals forces, dipolar interactions, hydrogen bonds, metallic bonds, or covalent bonds. For examples, particles, such as nanoparticles, may form particle aggregates (such as particle chains or other particle assemblies) through inter-particle forces. In some examples, the particle assemblies formed in the fluid during a rest state may be broken apart (e.g., into individual particles and/or smaller assemblies) during actuation of the lens. For example, particle assemblies may be disrupted by shear stresses that may occur during actuation of the lens.

In some examples, a lens fluid may include an additive, and the additive may include particles, such as nanoparticles. Particles may include silica particles (e.g., silica nanoparticles), such as fumed silica particles, hydrophobic silica particles, and in some examples, hydrophobic fumed silica particles. Particles, such as silica particles, may have surface groups that render the particles hydrophobic. Example surface groups may include alkyl groups such as alkyl chains, other hydrocarbon-based groups, or silane or siloxane groups such as siloxane (e.g., polydimethylsiloxane) chains, or other groups which may impart hydrophobic properties to the particles, such as silica particles (which may be otherwise hydrophilic). Particles may include nanoparticles, such as silica nanoparticles, such as hydrophobic silica nanoparticles. In some examples, particles may include polymer-coated particles, or polymer particles. In some examples, particles may include PDMS (polydimethylsiloxane) or similar material, for example as the particle or a coating.

In some examples, the particles may include dielectric particles, such as oxide particles. Particles may include one or more metal oxides (e.g., alumina, or other metal oxide), such as one or more transition metal oxides, for example, titanium oxide (e.g., titania), or zirconium oxide (e.g., zirconia). In some examples, particles may include a glass and/or a ceramic. In some examples, particles may include one or more polymers. In some examples, particles may include a glass, a ceramic, and/or other dielectric material.

In some examples, a lens fluid may include a silicon-containing liquid compound, such as a silicone oil. An additive may be added to a silicone oil, and/or the composition of the silicone oil may be modified, to increase the cohesive energy of the lens fluid. Example silicone oils may include silicon-containing compounds including one or more aromatic moieties, such as a phenylated silicon-containing compound. In some examples, the silicon-containing liquid compound may be functionalized with one or more functional groups. In some examples, the silicon-containing compound may include one or more functional groups (e.g., including electronegative atoms or other suitable groups) that may form non-covalent intermolecular bonds (e.g., hydrogen bonds), or dipolar interactions, with other molecules of the same or other molecular species, or other fluid components, such as a silicone oil or particles disposed therein. Example functional groups may include hydroxyl groups, acid groups, amines, amides, carboxyl groups, other acid groups, salts, halogens (e.g., fluoro groups), and the like. In some examples, fluid components may include one or more of alcohols, ketones, ethers, amides, or hydroxyl groups, such as silanol groups (Si—OH). In some examples, a lens fluid may include a polymer component, such as a polyol, which may interact with one or more non-polymer components, or other polymers, or with itself, with particles, or with silicon-containing compounds. In some examples, a lens fluid may include a polyphenylether (PPE). In some examples, a lens fluid may include a polyphenylthioether.

In some examples, a lens fluid may include one or more polar molecular moieties, such as a polar fluorocarbon. In some examples, interactions between one or more fluid components may create a network of hydrogen bonds (or other molecular interactions, such as van der Waals interactions) within the lens fluid.

In some examples, a lens fluid may include a polymer that may form a network, such as a hydrogen bonded network, with other fluid components, or with itself. Examples include polymer carbohydrates, such as polysaccharides, such as gums, or other polymers. The network may form during the fluid when the fluid is substantially at rest, and the network may be disrupted on actuation of the lens.

A fluid component, such as a polymer or low molecular weight molecule, may include one or more atoms or functional groups which may act as a donor and/or an acceptor in a hydrogen bond. Example donors may include —OH (hydroxyl, such as found in silanol groups), amine groups (e.g., —NH$_2$) amides, and the like, such as hydrogen covalently bonded to a relatively electronegative atom. Example acceptors may include atoms such as oxygen (e.g., a carboxyl group), or nitrogen (e.g., within an amine or amide group). In some examples, a lens fluid may include a phenylated silicon-containing molecule having one or more donor and/or acceptor groups. In some examples, a polymer component of the lens fluid may include one or more donor and/or acceptor groups, which may interact with corresponding groups in other molecules of the same or different species, or a particle, such as surface groups of a particle, for example, a surface-modified silica nanoparticle.

In some examples, the cohesive energy density of a fluid may be estimated from the heat of vaporization. In some examples, an additive may appreciably increase the heat of vaporization of a lens fluid, for example, by at least approximately 5%, or by at least approximately 10%, or by at least approximately 20%, for example, by at least 50%. Heat of vaporization may be measured by differential scanning calorimetry or other suitable process.

In some examples, a lens fluid may include one or more phenylated siloxanes (e.g., pentaphenyl trimethyl trisiloxane) and/or derivatives thereof. In some examples, one or more hydrogen atoms of a phenylated siloxane (such as pentaphenyl trimethyl trisiloxane) may be substituted with a polar functional group, such as a hydroxyl group, to increase intermolecular and/or intramolecular interactions. For example, a lens fluid may include a phenylated siloxane with one or more donor and/or acceptor groups of the kind described above.

Examples described herein include a fluid lens, such as a liquid lens, having a fluid lens enclosure (which may be termed a "enclosure" for conciseness) containing a lens fluid. In some examples, an enclosure may be non-nucleating. In this context, a non-nucleating lens enclosure may be a lens enclosure having a reduced propensity for formation of bubbles in the enclosed fluid. In some examples, a fluid may include one or more of a liquid, a gel, a colloid, a suspension (e.g., a suspension of particles in a liquid or other fluid), and the like.

In some examples, the interior surface of an enclosure may have a coating disposed proximate or adjacent the enclosed fluid. Example coatings and devices including such coatings are described, for example, in U.S. Provisional Application No. 62/930,790, filed Nov. 5, 2019, the disclosure of which is incorporated, in its entirety, by this reference.

In some approaches, the coating may substantially eliminate, or otherwise reduce, the number of nucleation sites for gas bubbles to form within the enclosure fluid. The coating may appreciably reduce the probability of bubble formation within the enclosure, particularly when the lens has a negative gage pressure (e.g., for a concave membrane). The coating may include a solid, such as a polymer. In some examples, the fluid may include an amount of additive effective to reduce solubility of gas in the fluid and thereby reduce bubble formation within the lens fluid, in particular when the fluid subjected to negative gage pressure during operation of the fluid lens. The additive may include particles, such as nanoparticles.

In some examples, the coating may include a plurality of nucleation sites, such as an arrangement of nucleation sites disposed on the interior surface of the enclosure. Surprisingly, the plurality of nucleation sites may reduce or substantially prevent stable bubble formation. If a volume of fluid associated with each nucleation site contains insufficient gas to form a stable bubble, then stable bubble formation may be prevented. The volume of fluid associated with each nucleation site may be estimated by dividing the lens fluid volume by the number of nucleation sites. Hence, increasing the number of nucleation sites for bubble formation may, counter-intuitively, reduce the likelihood of bubble formation.

A device may include a plurality of nucleation sites providing locations for bubble nucleation within the fluid. Nucleation sites may be introduced into the enclosure of the device using one or more approaches. An arrangement of scratches, protrusion, pits, other depressions, or other surface features may be formed in (or on) the interior surface of a substrate, or in (or on) a coating formed thereon. In some examples, an interior surface (or a coating formed thereon) may be patterned, scratched or otherwise abraded, or otherwise textured (e.g., using lithography), or the surface may include or otherwise support protrusions, structures such as particles, or the like. Nucleation sites may include particles, such as microparticles or nanoparticles, that may be suspended within the lens fluid, and/or embedded in, or otherwise supported by, at least a portion of the enclosure surface. Nucleation sites may be provided by the substrate surface, or the interior surface of the remainder of the enclosure.

In some examples, a coating formed on an interior surface of an enclosure may have a porous structure, and provide a relatively large number of nucleation sites (e.g., compared with a non-porous surface). For example, a coating may include a porous glass, sol-gel, or similar material and/or structure.

In some examples, an array of pillars may be formed on an interior surface of the enclosure, or a coating deposited thereon. In some examples, pillars, pits, or other depressions or protrusions may be formed using one or more of; etching (e.g., wet etching, laser etching), lithography, patterned deposition, abrasion, deposition of rough or porous surfaces, and the like.

In some examples, a plurality of particles may be introduced into a lens fluid to provide nucleation sites. The particles may include microparticles and/or nanoparticles. The particles may be configured to avoid aggregation (e.g., clumping), for example, using surface polar charges which repel other same-polarity surface polar charges. Surface polar charges may be introduced using surface functional groups (e.g., polar functional groups), adsorbed polar molecules, or similar approaches. In some examples, particles introduced to provide nucleation sites may be non-spherical, and may have an angular outside surface.

A lens fluid may include a suspension of nanoparticles in a high-refractive index liquid. A high refractive index liquid may have a refractive index greater than approximately 1.3, for example, greater than approximately 1.4. Example high refractive index liquids include the various lens fluids discussed elsewhere in this disclosure, such as silicone oils. In some examples, a fluid may support a suspension of particles. The particles (e.g., nanoparticles) may have a higher refractive index than that of the fluid (e.g., at one or more visible wavelengths), so that the nanoparticles may increase the refractive index of the particle suspension.

In some examples, a fluid lens, such as a liquid lens, includes an elastic membrane, a substrate, and a fluid (such as a liquid) filling an enclosure at least partially defined by the elastic membrane and the substrate. In some examples, a coating may be applied to at least a portion of the enclosure surfaces, such as the membrane and/or substrate interior surfaces that define the enclosure and are in contact with the fluid when the enclosure is filled with the fluid.

In some examples, the coating may include a polymer (e.g., an acrylate, silicone, epoxy, urethane, or other polymer, or co-polymers or blends thereof). In some examples, the coating may have a limited solubility in the liquid and may have no appreciable solubility in the liquid.

In some examples, a method (e.g., a method of fabricating a fluid lens) includes preparing a liquid mixture including a coating material and filling the enclosure of a fluid lens with the mixture. A low-nucleation coating may then form on the enclosure surface of the fluid lens, including the coating material. The method may be a method of fabricating a fluid lens, such as a method of applying a low-nucleation coating to the enclosure surface of a fluid lens. In some examples, the liquid mixture may separate when in the enclosure of the fluid lens, and the low-nucleation coating may be formed from a mixture component including the coating material. In some examples, the mixture may include an emulsion of the coating material, for example, an emulsion of the coating material in a liquid. In some examples, the coating material and the fluid may be miscible. In some examples, the lens enclosure may be filled by the mixture at an elevated temperature.

In some examples, the coating material may include one or more polymerizable materials, such as one or more monomer molecular species. In some examples, the polymerizable material (such as a monomer) is polymerized after the fluid lens is filled with the mixture. Example coating materials may include one or more monomer molecular species, such as an epoxy, an acrylate (e.g., ethyl acrylate), a silicone (e.g., an alkylsiloxane, such as a dialkylsiloxane, such as dimethylsiloxane), or other suitable monomer. A polymerizable material, such as a monomer, may be thermally polymerized, and polymerization may optionally be promoted by addition of a catalyst or an initiator. In some examples, a polymerizable material may be polymerized using actinic radiation, such as UV and/or visible electromagnetic radiation, or an electron beam.

In some examples, a method (e.g., a method of applying an low-nucleating coating) includes forming a coating on the interior surfaces of the fluid lens enclosure, and filling the fluid lens enclosure with a fluid (such as a high refractive index fluid, such as a silicone oil). In some examples, the coating is further processed before filling the lens with a fluid. For example, the initially deposited coating may be subject to one or more of the following: drying (including vapor removal), heat treatment, polymerization, cross-linking, further chemical treatment, further coating deposition, and the like. In some examples, the coating may undergo further processes after the enclosure is filled with a fluid. In some examples, the coating may be dried after filling with a fluid, where, for example, any fluid components of the coating (such as a solvent) may evaporate through the membrane, or other lens component. In some examples, a polymerizable component of the coating may be polymerized after the enclosure is filled with a lens fluid.

In some examples, fluid lenses may have a coating formed on at least part of the enclosure surface to reduce (e.g., substantially eliminate) bubble formation in the fluid lens. In some examples, gas solubility in the lens fluid may also be reduced. In some examples, a lens fluid may be used that has a reduced propensity for bubble formation.

As detailed above, reducing bubble formation allows negative pressures to be applied to the lens fluid of a fluid lens, allowing a greater range of focal lengths and/or optical powers to be achieved by a fluid lens. In some examples, a fluid lens may have a membrane which may be adjusted from a generally convex configuration, through a generally planar configuration, to a generally concave configuration, and vice versa. This allows the fabrication of thinner and/or lighter lens configurations. The availability of concave configurations also allows a greater range of optical powers to be achieved. In some examples, the substrate of the fluid lens may have a curved exterior and/or interior profile and may contribute to the optical power of the fluid lens.

In some examples, a fluid lens includes a substrate and flexible membrane enclosing a fluid. Bubble formation in the fluid may occur, particularly under reduced pressure, and is undesirable. An improved fluid lens is less susceptible to bubble formation and may include a fluid with reduced gas solubility. Gas solubility may be reduced by increasing the cohesive energy of the fluid, for example, using an additive to the fluid. The additive may include particles, such as nanoparticles, and may include silica particles.

When the fluid is at rest, the particles may interact to form particle assemblies, such as particle chains and/or particle networks, increasing the cohesive energy. These particle assemblies may be readily broken apart by fluid flow, reducing viscosity (and hence imparting thixotropic properties to the fluid) and allowing a reasonable response time for lens adjustment.

An example additive may include particles, such as silica particles, for example, hydrophobic silica particles (e.g., silica particles with hydrophobic surface groups). Silica particles may include nanoparticles. Example silica particles may include fumed silica particles, such as hydrophobic fumed silica particles, such as hydrophobic fumed silica nanoparticles. Particles may include synthetic amorphous silica particles. Particles may have a generally hydrophobic surface, for example, due to surface treatment of the particles after preparation of the particles. For example, surface silanol groups may be functionalized to impart hydrophobic properties to the particles, for example, using alkylsilanes or other organosilanes. Particles may be prepared by any suitable process, for example, by fumed or thermal processes, such as flame-based, electric arc based, or plasma-based processes.

An additive, which may include particles, may also advantageously increase the refractive index of the fluid suspension of nanoparticles, or may help maintain a high refractive index of the fluid (e.g., a refractive index greater than 1.4).

The likelihood of bubble formation within a fluid may be estimated by assuming that all of the dissolved gas forms a single bubble. If this single bubble is not large enough to overcome surface tension forces, there appears no possibility of bubble formation, which is termed "absolute stability". However, a slightly higher gas solubility may allow practical stability against bubble formation. In other approaches, a large number of nucleation sites may be provided (e.g., as suspended nanoparticles and/or surface features) so that no single bubble is large enough to survive surface tension forces. This may be termed "seeding stability" and may be related to meeting the absolute stability condition for a sub-volume associated with each nucleation site. Similar concepts may be applied in optical devices and other applications of fluid lenses. Increasing the number of nucleation sites, for example, by deliberately increasing the number of nucleation sites in a fluid volume and/or on the enclosure surface in order to prevent nucleated bubbles from reaching a stable diameter may also be referred to as "overseeding".

In some examples, a device includes a fluid lens, which may include a substrate, a membrane, and a fluid located within an enclosure. The enclosure may be at least partially defined by the substrate and the membrane. The fluid may include an additive that appreciably reduces bubble formation within the fluid, and the additive may include particles, such as nanoparticles. In some examples, the fluid may have thixotropic properties, such as shear thinning or other reduction of fluid viscosity under agitation, shear, or other stimulus. The thixotropic properties may be imparted to the fluid by the presence of the additive.

In some examples, the fluid includes a silicone oil. In this context, a silicone oil may be a liquid including a silicone compound, such as a phenylated siloxane. In some examples, the fluid may include suspended particles, such as particles suspended in a liquid. Particles may include nanoparticles, such as silica nanoparticles. Particles, such as silica nanoparticles, may have surface groups, such as hydrophobic surface groups. In some examples, surface groups may include surface functional groups, such as silane, carbonyl, amine, hydroxyl, or other groups. In some examples, particles, such as nanoparticles, may interact with each other to form particle aggregates within the fluid. The creation of and disruption of particle aggregates, such as nanoparticle aggregates, may impart an appreciable thixotropic property to the fluid.

In some examples, a device may include a plurality of nucleation sites. A nucleation site may provide a location for bubble nucleation within the fluid. For example, a bubble may nucleate proximate the interface between the fluid and a substrate or other interior surface of the enclosure. A plurality of nucleation sites may include one or more of a particle (e.g., a particle within the fluid, or at an interface between the fluid and a substrate), or a substrate surface feature such as a surface protrusion, a surface recess, or a surface structure supported by the substrate.

Examples disclosed herein may include fluid lenses, membrane assemblies (that may include a membrane and, e.g., a peripheral structure such as a support ring or a peripheral wire), and devices including one or more fluid lenses. Example devices may include ophthalmic devices (e.g., spectacles), augmented reality devices, virtual reality devices, and the like. In some examples, a device may include a fluid lens configured as a primary lens of an optical device, for example, as the primary lens for light entering the user's eye.

In some examples, a fluid lens may include a peripheral structure, such as a support ring, or a peripheral wire. A peripheral structure may include a support member affixed to the perimeter of a distensible membrane in a fluid lens. The peripheral structure may have generally the same shape as the lens periphery. In some examples, non-round fluid lens may include a peripheral structure that may bend normally to a plane, for example, a plane corresponding to the membrane periphery for a round lens. The peripheral structure may also bend tangentially to the membrane periphery.

A fluid lens may include a membrane, such as a distensible membrane. A membrane may include a thin sheet or film (having a thickness less than its width or height). The membrane may provide the deformable optical surface of an adjustable fluid lens. The membrane may be under a line tension, which may be the surface tension of the membrane. Membrane tension may be expressed in units of N/m.

In some examples, a device includes a membrane, a support structure configured to provide a guide path for an edge portion of the membrane, an interface device which connects the membrane, or a peripheral structure disposed around the periphery of the membrane, to the support structure and allows the membrane to move freely along the guide path, a substrate, and an edge seal. In some examples, the support structure may be rigid, or semi-rigid.

In some examples, an adjustable fluid-filled lens may include a membrane assembly. A membrane assembly may include a membrane (e.g., having a line tension), and a wire or other structure extending around the membrane (e.g., a peripheral guide wire). A fluid lens may include a membrane assembly, a substrate, and an edge seal. In some examples, the membrane line tension may be supported by a support ring. This may be augmented by a static restraint and/or a hinge point at one or more locations on the support ring.

In some examples, a fluid lens may include a membrane, a support structure configured to provide a guide path for an edge portion of the membrane, and a substrate. The fluid lens may further include an interface device, configured to connect the membrane to the support structure and to allow the edge portion of the membrane to move freely along the guide path, a substrate, and an edge seal. In some examples, fluid lenses may include lenses having an elastomeric or otherwise deformable element (such as a membrane), a substrate, and a fluid. In some examples, movement of a control point of the membrane, for example, as determined by the movement of a membrane attachment along a guide path, may be used to adjust the optical properties of a fluid lens.

In some examples, a fluid lens, such as an adjustable fluid-filled lens, may include a pre-strained flexible membrane which at least partially encloses a fluid volume, a fluid enclosed within the fluid volume, and a flexible edge seal which defines a periphery of the fluid volume, and an actuation system configured to control the edge of the membrane such that the optical power of the lens can be modified. The fluid volume may be referred to as an enclosure.

Controlling the edge of the membrane may require energy to deform the membrane, and/or energy to deform a peripheral structure such as a support ring, or a wire (e.g., in the case of a non-round lens). In some examples, a fluid lens configuration may be configured to reduce the energy required to change the power of the lens to a low value, for example, such that the change in elastic energy stored in the membrane as the lens properties change may be less than the energy required to overcome, for example, frictional forces.

In some examples, an adjustable focus fluid lens includes a substrate and a membrane (e.g., an elastic membrane), where a lens fluid is retained between the membrane and the substrate. The membrane may be under tension, and a mechanical system for applying or retaining the tension in the membrane at sections may be provided along the membrane edge or at portions thereof. The mechanical system may allow the position of the sections to be controllably changed in both height and radial distance. In this context, height may refer to a distance from the substrate, along a direction normal to the local substrate surface. In some examples, height may refer to the distance from a plane extending through the optical center of the lens and perpendicular to the optic axis. Radial distance may refer to a distance from a center of the lens, in some examples, a distance from the optical axis along a direction normal to the optical axis. In some examples, changing the height of at least one of the sections restraining the membrane may cause a change in the membrane's curvature, and the radial distance of the restraint may be changed to reduce increases in the membrane tension.

In some examples, a mechanical system may include a sliding mechanism, a rolling mechanism, a flexure mechanism, or an active mechanical system, or a combination thereof. In some examples, a mechanical system may include one or more actuators, and the one or more actuators may be configured to control both (or either of) the height and/or radial distance of one or more of the sections.

An adjustable focus fluid lens may include a substrate, a membrane that is in tension, a fluid, and a peripheral structure restraining the membrane tension, where the peripheral structure extends around a periphery of the membrane, and where, in some examples, the length of the peripheral structure and/or the spatial configuration of the peripheral structure may be controlled. Controlling the circumference of the membrane may controllably maintain the membrane tension when the optical power of the fluid lens is changed.

Changing the optical power of the lens from a first power to a second power may cause a first change in membrane tension if the membrane circumference does not change. However, changing the membrane circumference may allow a change in the membrane tension of approximately zero, or at least +/−1%, 2%, 3%, or 5%. In some examples, a load offset or a negative spring force may be applied to the actuator.

One or more components of a fluid lens may have strain energy within some or all operational configurations. In some examples, a fluid lens may include an elastomer membrane that may have strain energy if it is stretched. Work done by an external force, such as provided by an actuator when adjusting the membrane, may lead to an increase in the strain energy stored within the membrane. In some examples, one or more edge portions of the membrane are adjusted along a guide path such that the strain energy stored within the membrane may not be significantly changed, or changed by a reduced amount.

A force, such as a force provided by an actuator, may perform work when there is a displacement of the point of application in the direction of the force. In some examples, a fluid lens is configured so that there is no appreciable elastic force in the direction of the guide path. In such configurations, a displacement of the edge portion of the membrane along the guide path may not require work in relation to the elastic force. There may, however, be work required to overcome friction and other relatively minor effects.

In some examples, a fluid lens includes a support ring. A support ring may include a member affixed to a perimeter of a distensible membrane in a fluid-filled lens. The support ring may be approximately the same shape as the lens. For a circular lens, the support ring may be generally circular for spherical optics. For non-circular lenses, the support ring may bend normally to the plane defined by the membrane. However, a rigid support ring may impose restrictions on the positional adjustment of control points, and in some examples a wire is positioned around the periphery of the membrane. In some examples, a support ring may allow flexure out of the plane of the ring. In some examples, a support ring (or peripheral wire) may not be circular.

In some examples, a fluid lens may include one or more membranes. An example membrane may include a thin polymer film, having a membrane thickness much less than the lens radius, or other lateral extent of the lens. For example, the membrane thickness may be less than approximately 1 mm. The lateral extent of the lens may be at least approximately 10 mm. The membrane may provide the deformable optical surface of a fluid lens, such as an adjustable liquid-filled lens. A fluid lens may also include a substrate. The substrate may have opposite surfaces, and one surface of the substrate may provide one lens surface of an adaptable fluid-filled lens, opposite the lens surface provided by the membrane. An example substrate may include a rigid layer, such as a rigid polymer layer, or a rigid lens. In some examples, one or more actuators may be used to control the line tension of a distensible membrane, where line tension may be expressed in units of N/m. A substrate may include a rigid polymer, such as a rigid optical polymer. In some examples, a fluid lens may include an edge seal, for example, a deformable component, such as a polymer film, configured to retain the fluid in the lens. The edge seal may connect a peripheral portion of the membrane to a peripheral portion of the substrate, and may include a thin flexible polymer film.

In some examples, a membrane may include one or more control points. Control points may include locations proximate the periphery of the membrane, movement of that may be used to control one or more optical properties of a fluid lens. In some examples, the movement of the control point may be determined by the movement of a membrane attachment along a trajectory (or guide path) determined by a support structure. In some examples, a control point may be provided by an actuation point, for example, a location on a peripheral structure, such as a membrane attachment, that may have a position adjusted by an actuator. In some examples, an actuation point may have a position (e.g., relative to the substrate) controlled by a mechanical coupling to an actuator. A membrane attachment may mechanically interact with a support structure, and may be, for example, moveable along a trajectory (or guide path) determined by the support structure (e.g., by a slot or other guide structure). Control points may include locations within an edge portion of a membrane that may be moved, for example, using an actuator, or other mechanism. In some examples, an actuator may be used to move a membrane attachment (and, e.g., a corresponding control point) along a guide path provided by a support structure, for example, to adjust one or more optical properties of the fluid lens. In some examples, a membrane attachment may be hingedly connected to a support structure at one or more locations, optionally in addition to other types of connections. A hinged connection between the membrane and a support structure may be referred to as a hinge point.

A fluid lens may be configured to have one or both of the following features: in some examples, the strain energy in the membrane is approximately equal for all actuation states; and in some examples, the force reaction at membrane edge is approximately normal to the guide path. Hence, in some examples, the strain energy of the membrane may be approximately independent of the optical power of the lens. In some examples, the force reaction at the membrane edge is normal to the guide path, for some or all locations on the guide path.

In some examples, a guide path may be provided by a support structure including one or more of the following: a pivot, a flexure, a slide, a guide slot, a guide surface, a guide channel, a hinge, or other mechanism. A support structure may be entirely outside the fluid volume, entirely inside the fluid volume, or partially within the fluid volume.

In some examples, a fluid lens may include a relatively rigid substrate and a flexible polymer membrane. The membrane may be attached to a support structure at control points around the membrane periphery. A flexible edge seal may be used to enclose the fluid. The lens power can be adjusted by moving the location of control points along guide trajectories, for example, using one more actuators. Guide paths (that may correspond to allowed trajectories of control points) may be determined that maintain a constant elastic deformation energy of the membrane as the control point location is moved along the guide path. Guide devices may be attached to (or formed as part of) the substrate.

Sources of elastic energy include hoop stress (tension in azimuth) and line strain, and elastic energy may be exchanged between these as the membrane is adjusted. In some examples, the force direction used to adjust the control point location may be normal to the elastic force on the support structure from the membrane. There are great possible advantages to this approach, including much reduced actuator size and power requirements, and a faster lens response that may be restricted only by viscous and friction effects.

In some examples, one or more optical parameters of a fluid lens may be determined at least in part by a physical profile of a membrane. In some examples, a fluid lens may be configured so that one or more optical parameters of the lens may be adjusted without significant change in the elastic strain energy in the membrane. For example, the elastic strain energy in the membrane may change by less than 20% as the lens is adjusted. In some examples, one or more optical parameters of the lens may be adjusted using an adjustment force, for example, a force applied by an actuator, that is normal to a direction of an elastic strain force in the membrane. In some examples, a guide path may be configured so that the adjustment force may be at least approximately normal to the elastic strain force during adjustment of the lens. For example, the angle between the adjustment force and the elastic strain force may be within 5 degrees of normal, for example, within 3 degrees of normal. In some examples, fluid motion during an adjustment of the lens may induce a reduction in the viscosity of the fluid, for example, the flow may disrupt interactions between particles or molecules within the fluid, which may disrupt particle and/or molecular aggregation.

In some examples, a fluid lens includes a fluid, a substrate, and a membrane, with the substrate and the membrane at least partially enclosing the fluid. The lens fluid may include a liquid, such as an oil, such as a silicone oil, such as a phenylated silicone oil.

In some examples, a lens fluid may be (or include) a transparent fluid. In this context, a transparent fluid may have little or substantially no visually perceptible visible wavelength absorption over an operational wavelength range. However, fluid lenses may also be used in the UV (ultraviolet) and the IR (infrared), and in some examples the fluid used may be generally non-absorbing in the wavelength range of the desired application, and may not be transparent over some or all of the visible wavelength range. In some examples, the membrane may be transparent, for example, optically clear at visible wavelengths.

In some examples, a lens fluid may include an oil, such as an optical oil. In some examples, a lens fluid may include one or more of a silicon-containing compound (e.g., a silicone), a thiol, or a cyano compound. The fluid may include a silicone-based fluid, which may sometimes be referred to as a silicone oil. Example lens fluids include aromatic silicones, such as phenylated siloxanes, for example, pentaphenyl trimethyl trisiloxane. Example lens fluids may include a phenyl ether or phenyl thioether. Example lens fluids may include molecules including a plurality of aromatic rings, such as a polyphenyl compound (e.g., a polyphenyl ether or a polyphenyl thioether).

In some examples, a fluid lens includes, for example, a membrane at least partially enclosing a fluid. A fluid may be, or include, one or more of the following: a gas, gel, liquid, suspension, emulsion, vesicle, micelle, colloid, liquid crystal, or other flowable or otherwise deformable phase. For example, a fluid may include a colloidal suspension of particles, such as nanoparticles.

In some examples, a lens fluid may have a visually perceptible color or absorption, for example, for eye protection use or improvement in visual acuity. In some examples, the lens fluid may have a UV absorbing dye and/or a blue absorbing dye, and the fluid lens may have a slightly yellowish tint. In some examples, a lens fluid may include a dye selected to absorb specific wavelengths, for example, laser wavelengths in the example of laser goggles. In some examples, a device including a fluid lens may be configured as sunglasses, and the lens fluid may include an optical absorber and/or photochromic material. In some examples, a fluid lens may include a separate layer, such as a light absorption layer configured to reduce the light intensity passed to the eye, or protect the eye against specific wavelengths or wavelength bands. Reduced bubble formation may greatly enhance the effectiveness of laser protection devices, by reducing scattering of the laser radiation, and reduction of low-absorption portions of the device.

A fluid lens may include a deformable element such as a polymer membrane, or other deformable element. A polymer membrane may be an elastomer polymer membrane. Membrane thicknesses may be in the range 1 micron-1 mm, such as between 3 microns-500 microns, for example, between 5 microns and 100 microns. An example membrane may be more of the following: flexible, optically transparent, water impermeable, and/or elastomeric. A membrane may include one or more elastomers, such as one or more thermoplastic elastomers. A membrane may include one or more polymers, such as one or more of the following: a polyurethane (such as a thermoplastic polyurethane (TPU), a thermoplastic aromatic polyurethane, an aromatic polyether polyurethane, and/or a cross-linked urethane polymer), a silicone elastomer such as a polydimethylsiloxane, a polyolefin, a polycycloaliphatic polymer, a polyether, a polyester (e.g., polyethylene terephthalate), a polyimide, a vinyl polymer (e.g., a polyvinylidene chloride), a polysulfone, a polythiourethane, polymers of cycloolefins and aliphatic or alicyclic polyethers, a fluoropolymer (e.g., polyvinylfluoride), another suitable polymer, and/or a blend, derivative, or analog of one or more such polymers. The membrane may be an elastomer membrane, and the membrane may include one or more elastomers.

In some examples, at least part of the interior surface of the enclosure may have a coating that reduces, substantially eliminates, or in some examples, greatly increases the number of nucleation sites for formation of bubbles in the lens fluid. The coating may be located between the lens fluid and the interior surface of the enclosure (that may include interior surfaces of the membrane and/or substrate). In some examples, the coating may prevent the lens fluid, such as an optical oil, from penetrating the membrane, which may otherwise degrade the optical and/or physical properties of the membrane (e.g., by causing the membrane to become cloudy, swell, and/or to lose tension. In some examples, the coating may both appreciably reduce bubble formation, and appreciably reduce fluid diffusion into the membrane (e.g., by reducing the rate of fluid diffusion into the membrane by at least 50%, compared to an uncoated membrane under similar conditions).

In some examples, a fluid lens may include a substrate. The substrate may be relatively rigid, and may exhibit no visually perceptible deformation due to, for example, adjusting the internal pressure of the fluid and/or tension on the membrane. In some examples, the substrate may be a generally transparent planar sheet. The substrate may include one more substrate layers, and a substrate layer may include a polymer, glass, optical film, and the like. Example glasses include silicate glasses, such as borosilicate glasses. In some examples, a substrate may include one or more polymers, such as an acrylate polymer (e.g., polymethylmethacrylate), a polycarbonate, a polyurethane (such as an aromatic polyurethane), or other suitable polymer. In some examples, one or both surfaces of a substrate may be planar, spherical, cylindrical, spherocylindrical, convex, concave, parabolic, or have a freeform surface curvature. One or both surfaces of a substrate may approximate a prescription of a user, and adjustment of the membrane profile (e.g., by adjustment of the membrane curvature) may be used to provide an improved prescription, for example, for reading, distance viewing, or other use. In some examples, the substrate may have no significant optical power, for example, by having parallel planar surfaces.

Membrane deformation may be used to adjust an optical parameter, such as a focal length, around a center value determined by relatively fixed surface curvature(s) of a substrate or other optical element, for example, of one or both surfaces of a substrate.

In some examples, the substrate may include an elastomer, and may in some examples have an adjustable profile (that may have a smaller range of adjustments than provided by the membrane). In some examples, the substrate may be omitted and the fluid enclosed by a pair of membranes or other flexible enclosure configuration.

In some examples, a fluid lens may include one or more actuators. The one or more actuators may be used to modify the elastic tension of a membrane, and may hence modify an optical parameter of a fluid lens including the membrane. The membrane may be connected to a substrate around the periphery of the membrane, for example, using a connection assembly. The connection assembly may include one or more of an actuator, a post, a wire, or other connection hardware. In some examples, one or more actuators are used to adjust the curvature of the membrane, and hence the optical properties of the fluid lens.

Applications of the concepts described herein include fluid lenses, and devices that may include one or more fluid lenses, such as ophthalmic devices (e.g., glasses), augmented reality devices, virtual reality devices, and the like. Fluid lenses may be incorporated into eyewear, such as wearable optical devices like eyeglasses, an augmented reality or virtual reality headset, and/or other wearable optical device. Due to the principles described herein, these devices may exhibit reduced thickness, reduced weight, improved wide-angle/field-of-view optics (e.g., for a given weight), and/or improved aesthetics. Examples include devices including one or more lenses shaped and sized for use in glasses, head-up displays, augmented reality devices, virtual reality devices, and the like. In some examples, the fluid lenses may be the primary viewing lenses for the device, for example, lenses through which light from the environment passes before reaching the eye of a user. In some examples, a fluid lens may have a diameter or other analogous dimension (e.g., width or height of a non-circular lens) that is between 20 mm and 80 mm.

As mentioned above, the fluid lenses described herein may be used to correct for VAC, which may refer to, for example, user discomfort while using an augmented reality or virtual reality device. VAC may be caused by the focal plane of virtual content (related to eye accommodation) not matching the virtual content's apparent distance based on stereoscopy (related to eye vergence). In augmented reality devices in which a virtual image is viewed in superposition with the real world, a pair of fluid lenses of the kind described herein may be used with an intermediate transparent display, an inner lens to adjust the focal plane of a virtual image projected by the display, and an outer lens to compensate for the inner lens so that light passing from outside through both lenses undergoes substantially no net change in focus, apart from a possible fixed prescription to correct for a user's vision.

In some examples, similar approaches may be used to reduce gas diffusion through a fluid lens membrane, such as through a membrane including a polymer film, for example as used in a fluid lens. In some examples, similar approaches may be used to reduce or substantially prevent fluid diffusion into a fluid lens component, such as a membrane and/or substrate.

In some examples, a device may include a fluid lens, which may also be referred to more simply as a lens for conciseness. The lens may include a membrane, a substrate (such as a rigid substrate, where one or both of the substrate surfaces may be planar or curved), and a fluid located within an enclosure formed at least in part by the membrane and the substrate. For example, the enclosure may be formed by the membrane, an edge seal, and a substrate. A coating may be disposed on at least a portion of the interior surface of the enclosure. The coating may have a coating surface adjacent the fluid. The membrane may be an elastic membrane. The coating and the membrane may have different compositions. The coating may significantly reduce bubble formation within the fluid. For example, bubble formation may be substantially eliminated, for example, when the fluid is under negative pressure. The lens may further include a support structure configured to retain the membrane under tension, which may be attached to the substrate. An optical property of the lens may be adjusted by adjusting a membrane profile, such as a curvature (e.g., a radius of curvature) of the membrane. The optical property may include an optical power of the fluid lens, and the optical power may be adjustable to a negative value. The membrane may have a membrane profile, which may have a membrane curvature, and the membrane curvature may be adjustable to a negative value. A negative value of membrane curvature may correspond to a negative radius of curvature of the exterior surface of the membrane, and may correspond to a concave lens exterior surface. For a negative surface, the center of curvature may be on the opposite side of the negative surface from the center of the lens (e.g., outside the exterior of the surface). The center of a negative surface may be closer to the center of the lens than the periphery, so the lens may be thinner within a central portion and thicker around the periphery. The substrate may be a rigid substrate. The coating surface may have a coating surface roughness, the interior surface of the enclosure (e.g., the at least a portion of the interior surface on which the coating is located) may have an enclosure surface roughness, and the coating surface roughness may be significantly less than the enclosure surface roughness.

In some examples, a fluid lens (e.g., a liquid lens) includes a substrate, a flexible membrane, and a fluid located with an enclosure formed between the substrate and the membrane. In conventional lenses, bubble formation within the lens fluid may reduce optical quality and aesthetics of the lens. In some cases, reduced pressure may be applied (e.g., to obtain a concave lens surface) and this may induce bubble formation on the inside surfaces of the substrate and membrane. Bubble formation may degrade the optical performance and/or appearance of the lens, but may be reduced or substantially prevented using one or more approaches such as those described herein. Ophthalmic applications of the concepts described herein include spectacles with a flat or curved front substrate and an adjustable eye-side concave, planar, or convex membrane surface. Applications also include optics, and other applications of fluid lenses, including augmented reality or virtual reality headsets.

In some examples, a coating may be formed on the interior surface of the enclosure before filling the enclosure with the fluid, and in some examples may occur after filling using components added to the fluid. For example, the surfaces may be coated with a polymer layer (e.g., by polymerizing a surface monomer layer), or with a fluid, gel, or emulsion layer that is immiscible with the lens liquid. A coating may include one or more of various materials, such as an acrylate polymer, a silicone polymer, an epoxy-based polymer, or a fluoropolymer. In some examples, a coating may include a fluoroacrylate polymer, such as perfluoroheptylacrylate, or other fluoroalkylated acrylate polymer.

Examples may include various methods, such as computer-implemented methods. Method steps may be performed by any suitable computer-executable code and/or computing system, and may be performed by the control system of a virtual and/or augmented reality system. Each of the steps of example methods may represent an algorithm whose structure may include and/or may be represented by multiple sub-steps. In some examples, a system according to the present disclosure may include at least one physical processor and physical memory including computer-executable instructions that, when executed by the physical processor, cause the physical processor to adjust the optical properties of a fluid lens substantially as described herein.

In some examples, a method may include providing a fluid lens assembly and introducing a lens fluid into the enclosure to form a fluid lens. The lens fluid may include an additive configured to reduce bubble formation within the lens fluid during operation of the fluid lens. The additive may include nanoparticles. The fluid lens assembly may include a substrate, an elastic membrane, and an enclosure at least partially enclosed by the substrate and the elastic membrane, the enclosure having an interior surface. The method may further include forming a suspension of the nanoparticles in the fluid, which may be prior to introducing a lens fluid into the enclosure to form a fluid lens. The method may further include forming a plurality of nucleation sites on an interior surface of the enclosure. The method may be a method of fabricating an eyewear device including the fluid lens, such as spectacles or other eyewear device, such as an augmented reality device, or a virtual reality device.

Allowing reduced pressure to be applied to the fluid, without bubble formation, may increase (e.g., double) the optical power range of an adjustable lens, for example, by enabling lens adjustment from a convex to a concave lens. In some examples, a lens may be adjusted from a plano-convex configuration (e.g., with positive optical power), through a plano-plano configuration (e.g., with zero optical power), to a plano-concave configuration (e.g., with negative optical power). In some examples, a lens may be adjusted from a biconvex form, through, for example, a plano-piano configuration, to a bi-concave configuration, or vice-versa.

In some examples, a device may include a fluid lens, and the fluid lens may include a substrate, a membrane, a fluid located within an enclosure (where the enclosure is at least partially defined by the substrate and the membrane, and has an interior surface). A coating may be disposed on at least a portion of the interior surface, the coating having a coating surface in contact with the fluid, where the coating appreciably reduces bubble formation within the fluid. The fluid may include a silicone oil, such as a phenylated siloxane. In some examples, the fluid may include suspended nanoparticles, and the nanoparticles may include silica nanoparticles. The nanoparticles may have a hydrophobic surface, which may be provided by one or more surface functional groups. In some examples, the nanoparticles may interact with each other to form nanoparticle aggregates within the fluid. The fluid may include an additive, such as nanoparticles, that may be a thixotropic agent that imparts an appreciable thixotropic property to the fluid.

In some examples, a fluid lens has an enclosure surface having a plurality of nucleation sites. The nucleation sites may provide locations for bubble nucleation within the fluid. The plurality of nucleation sites may include a suspension of the nanoparticles in the fluid, and/or a plurality of enclosure surface features, such as substrate surface features. Enclosure surface features may include one or more of: a surface protrusion, a surface recess, other surface structure, or one or more particles supported by the substrate. In some examples, surface features may include an arrangement of surface features on the surface, such as an array of surface features. Examples include an arrangement of particles on the surface. The fluid lens may include a membrane, such as an elastic membrane having a profile, the fluid lens may have an optical power, and the optical power of the fluid lens may be adjustable by adjusting the profile of the membrane. The profile of the membrane may have an associated membrane curvature. An example fluid lens may further include a support structure configured to retain the membrane under tension, and allow adjustment of the optical power of the fluid lens by adjusting the profile of the membrane. The optical power of the fluid lens may be adjustable to a negative value, for example, by application of a negative pressure to the lens. A device may further include a frame configured to support one or more fluid lens, and the device may be a head-mounted device such as an eyewear device.

In some examples, a method may include providing a fluid lens assembly including a substrate, an elastic membrane, and an enclosure at least partially enclosed by the substrate and the elastic membrane; and introducing a lens fluid into the enclosure to form a fluid lens, where the lens fluid includes an additive configured to reduce bubble formation within the lens fluid during operation of the fluid lens. The additive may include nanoparticles, and the fluid may include a suspension of the nanoparticles in a liquid. An example method may further include forming a plurality of nucleation sites on an interior surface of the enclosure, and may be a method of fabricating an eyewear device including the fluid lens.

Ophthalmic applications of the concepts described herein include spectacles with a flat front substrate and an adjustable eye-side concave or convex membrane surface. Applications also include optics, and other applications of fluid lenses, including augmented reality or virtual reality headsets.

EXAMPLE EMBODIMENTS

Example 1

An example device may include a fluid lens, and the fluid lens may include a membrane, a substrate, and a fluid located within an enclosure formed at least in part by the membrane and the substrate. The membrane may be an elastic membrane, the fluid may include an amount of an additive that is effective to appreciably reduce bubble formation within the fluid, and the additive may include particles.

Example 2

The device of example 1, where the fluid includes a silicone oil, a polyphenyl ether, or a polyphenyl thioether.

Example 3

The device of any of examples 1 or 2, where the fluid includes a suspension of the particles.

Example 4

The device of any of examples 1-3, where the particles include nanoparticles.

Example 5

The device of any of examples 1-4, where the particles include silica nanoparticles.

Example 6

The device of any of examples 1-5, where the particles have a hydrophobic surface.

Example 7

The device of any of examples 1-6, where the particles interact with each other to form particle aggregates within the fluid.

Example 8

The device of any of examples 1-7, where the additive imparts appreciable thixotropic properties to the fluid.

Example 9

The device of any of examples 1-8, where the fluid has a viscosity, and the viscosity of the fluid is reduced during an adjustment of the fluid lens.

Example 10

The device of any of examples 1-9, where the device includes nucleation sites for bubble formation within the fluid.

Example 11

The device of example 10, where the nucleation sites include the particles.

Example 12

The device of any of examples 10-11, where the enclosure has an enclosure surface, and the nucleation sites include surface features formed on the enclosure surface.

Example 13

The device of any of examples 10-12, where the surface features include at least one of a surface protrusion, a surface depression, or at least one of the particles supported by the substrate.

Example 14

The device of any of examples 1-13, where the elastic membrane has a profile, and the fluid lens further includes a support structure configured to retain the elastic membrane under tension, and to allow modification of an optical property of the fluid lens by allowing an adjustment of the profile of the elastic membrane.

Example 15

The device of any of examples 1-14, where the fluid is a thixotropic fluid, and the viscosity of the fluid is reduced during the adjustment of the profile of the elastic membrane.

Example 16

The device of any of examples 1-15, where the device is an eyewear device that includes a frame configured to support the fluid lens.

Example 17

A method, including: assembling a fluid lens assembly including a substrate and an elastic membrane, the fluid lens assembly having an enclosure at least partially enclosed by the substrate and the elastic membrane, the enclosure having an interior surface; and introducing a lens fluid into the enclosure to form a fluid lens, where the lens fluid includes a suspension of particles.

Example 18

The method of example 17, where the lens fluid includes an amount of the particles that is effective to appreciably reduce bubble formation within the lens fluid.

Example 19

The method of any of examples 17 and 18, where assembling the fluid lens assembly includes forming a plurality of nucleation sites on the interior surface of the enclosure.

Example 20

The method of any of examples 17-19, further including forming a number of nucleation sites that is effective to appreciably reduce bubble formation within the lens fluid.

Embodiments of the present disclosure may include or be implemented in conjunction with various types of artificial reality systems. Artificial reality is a form of reality that has been adjusted in some manner before presentation to a user, that may include, for example, a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of that may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 1100 in FIG. 11. Other artificial reality systems may include a NED that also provides visibility into the real world (e.g., augmented-reality system 1200 in FIG. 12) or that visually immerses a user in an artificial reality (e.g., virtual-reality system 1300 in FIG. 13). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
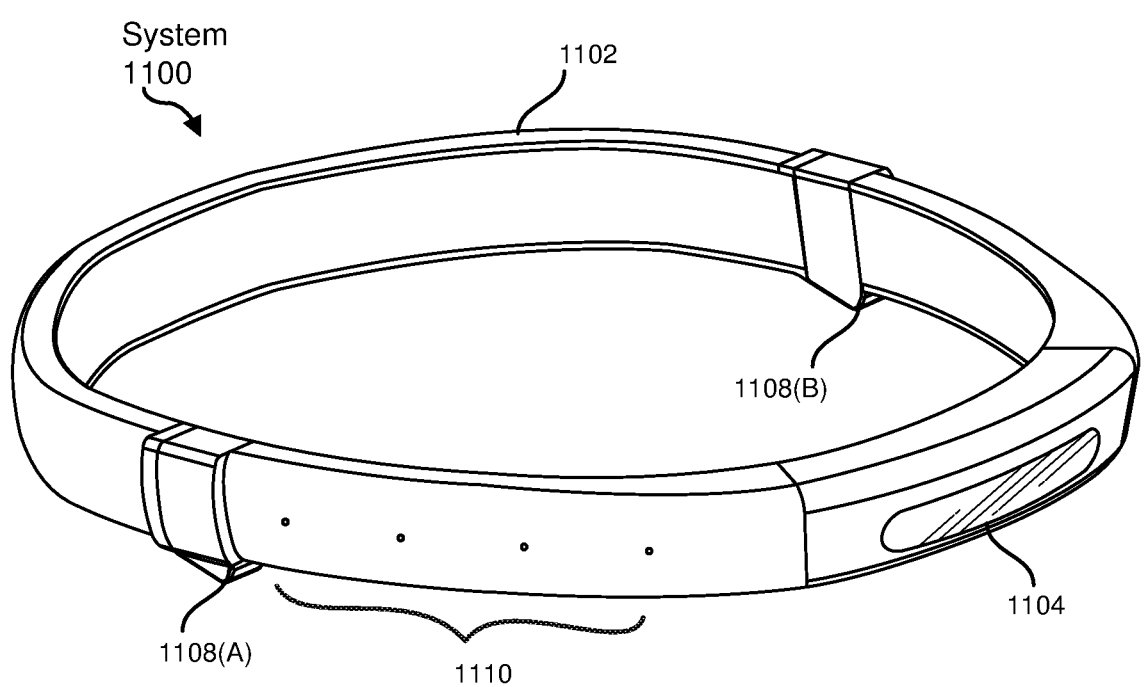
FIG. 11 is an illustration of an exemplary artificial-reality headband that may be used in connection with embodiments of this disclosure.

Turning to FIG. 11, augmented-reality system 1100 generally represents a wearable device dimensioned to fit about a body part (e.g., a head) of a user. As shown in FIG. 11, augmented-reality system 1100 may include a frame 1102 and a camera assembly 1104 that is coupled to frame 1102 and configured to gather information about a local environment by observing the local environment. Augmented-reality system 1100 may also include one or more audio devices, such as output audio transducers 1108(A) and 1108(B) and input audio transducers 1110. Output audio transducers 1108(A) and 1108(B) may provide audio feedback and/or content to a user, and input audio transducers 1110 may capture audio in a user's environment.

As shown, augmented-reality system 1100 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1100 may not include a NED, augmented-reality system 1100 may include other types of screens or visual feedback devices (e.g., a display screen integrated into a side of frame 1102).

Figure 12:
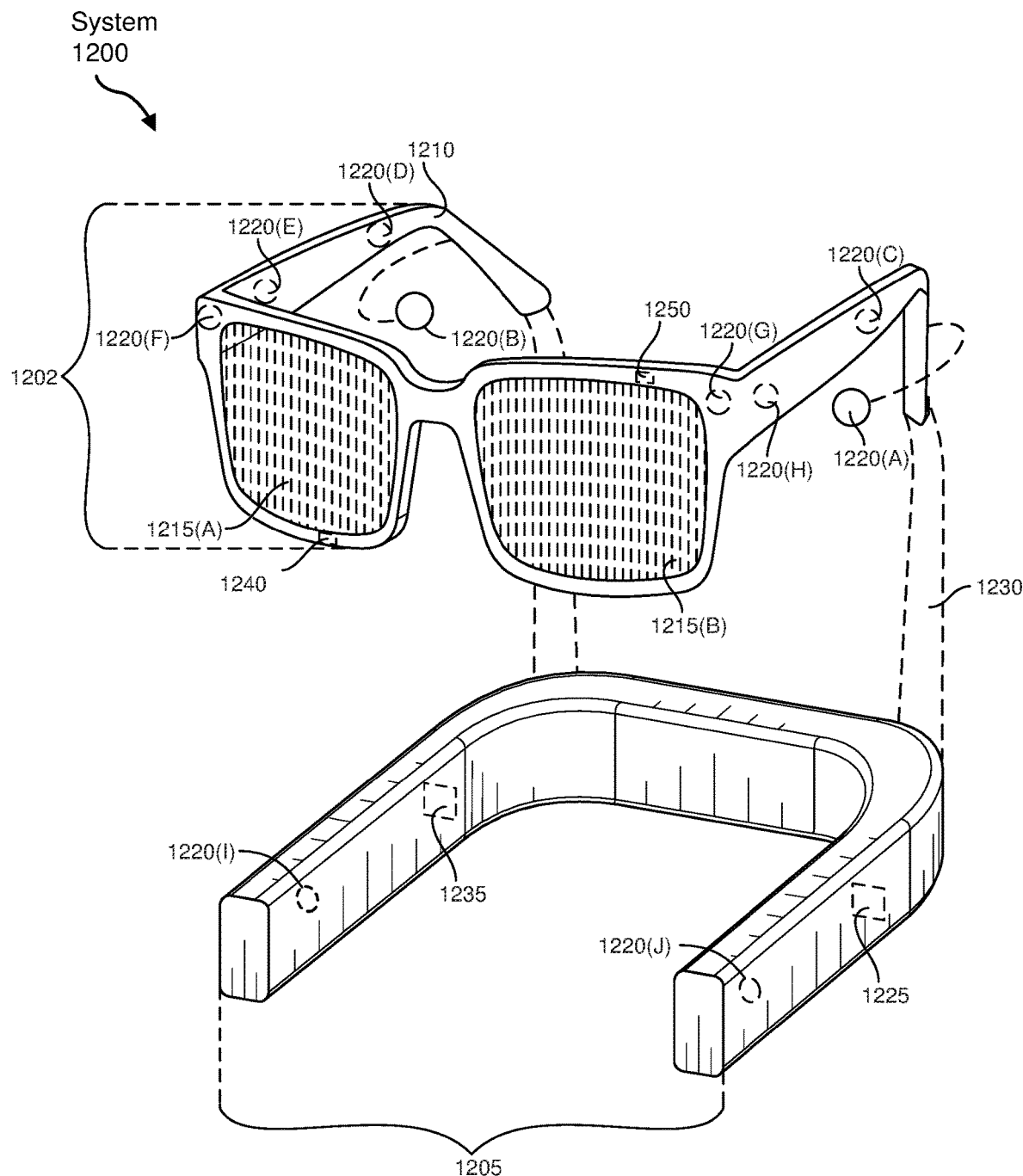
FIG. 12 is an illustration of exemplary augmented-reality glasses that may be used in connection with embodiments of this disclosure.

Example embodiments discussed in this disclosure may be implemented in augmented-reality systems that include one or more NEDs. For example, as shown in FIG. 12, augmented-reality system 1200 may include eyewear device 1202 with frame 1210 configured to hold left display device 1215(A) and right display device 1215(B) in front of a user's eyes. Display devices 1215(A) and 1215(B) may act together or independently to present an image or series of images to a user. While augmented-reality system 1200 includes two displays, embodiments of this disclosure may be implemented in augmented-reality systems with a single NED or more than two NEDs.

In some embodiments, augmented-reality system 1200 may include one or more sensors, such as sensor 1240. Sensor 1240 may generate measurement signals in response to motion of augmented-reality system 1200 and may be located on substantially any portion of frame 1210. Sensor 1240 may represent a position sensor, an inertial measurement unit (IMU), a depth camera assembly, or any combination thereof. In some embodiments, augmented-reality system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof.

Augmented-reality system 1200 may also include a microphone array with a plurality of acoustic transducers 1220(A)-1220(J), referred to collectively as acoustic transducers 1220. Acoustic transducers 1220 may be transducers that detect air pressure variations induced by sound waves. Each acoustic transducer 1220 may be configured to detect sound and convert the detected sound into an electronic format (e.g., an analog or digital format). The microphone array in FIG. 2 may include, for example, ten acoustic transducers: 1220(A) and 1220(B), that may be designed to be placed inside a corresponding ear of the user, acoustic transducers 1220(C), 1220(D), 1220(E), 1220(F), 1220(G), and 1220(H), that may be positioned at various locations on frame 1210, and/or acoustic transducers 1220(I) and 1220(J), that may be positioned on the neckband 1205.

In some embodiments, one or more of acoustic transducers 1220(A)-(F) may be used as output transducers (e.g., speakers). For example, acoustic transducers 1220(A) and/or 1220(B) may be earbuds or any other suitable type of headphone or speaker.

The configuration of acoustic transducers 1220 of the microphone array may vary. While augmented-reality system 1200 is shown in FIG. 12 as having ten acoustic transducers 1220, the number of acoustic transducers 1220 may be greater or less than ten. In some embodiments, using higher numbers of acoustic transducers 1220 may increase the amount of audio information collected and/or the sensitivity and accuracy of the audio information. In contrast, using a lower number of acoustic transducers 1220 may decrease the computing power required by the controller 1250 to process the collected audio information. In addition, the position of each acoustic transducer 1220 of the microphone array may vary. For example, the position of an acoustic transducer 1220 may include a defined position on the user, a defined coordinate on frame 1210, an orientation associated with each acoustic transducer, or some combination thereof.

Acoustic transducers 1220(A) and 1220(B) may be positioned on different parts of the user's ear, such as behind the pinna or within the auricle or fossa. Or, there may be additional acoustic transducers on or surrounding the ear in addition to acoustic transducers 1220 inside the ear canal. Having an acoustic transducer positioned next to an ear canal of a user may enable the microphone array to collect information on how sounds arrive at the ear canal. By positioning at least two of acoustic transducers 1220 on either side of a user's head (e.g., as binaural microphones), augmented-reality system 1200 may simulate binaural hearing and capture a 3D stereo sound field around about a user's head. In some embodiments, acoustic transducers 1220(A) and 1220(B) may be connected to augmented-reality system 1200 via a wired connection 1230, and in other embodiments, acoustic transducers 1220(A) and 1220(B) may be connected to augmented-reality system 1200 via a wireless connection (e.g., a Bluetooth connection). In some embodiments, acoustic transducers 1220(A) and 1220(B) may omitted, for example, in conjunction with augmented-reality system 1200.

Acoustic transducers 1220 on frame 1210 may be positioned along the length of the temples, across the bridge, above or below display devices 1215(A) and 1215(B), or some combination thereof. Acoustic transducers 1220 may be oriented such that the microphone array is able to detect sounds in a wide range of directions surrounding the user wearing the augmented-reality system 1200. In some embodiments, an optimization process may be performed during manufacturing of augmented-reality system 1200 to determine relative positioning of each acoustic transducer 1220 in the microphone array.

In some examples, augmented-reality system 1200 may include or be connected to an external device (e.g., a paired device), such as neckband 1205. Neckband 1205 generally represents any type or form of paired device. Thus, the discussion of neckband 1205 may also apply to various other paired devices, such as charging cases, smart watches, smart phones, wrist bands, other wearable devices, hand-held controllers, tablet computers, laptop computers and other external compute devices, etc.

As shown, neckband 1205 may be coupled to eyewear device 1202 via one or more connectors. The connectors may be wired or wireless and may include electrical and/or non-electrical (e.g., structural) components. In some cases, eyewear device 1202 and neckband 1205 may operate independently without any wired or wireless connection between them. While FIG. 12 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of eyewear device 1202 and neckband 1205 may be located on one or more additional peripheral devices paired with eyewear device 1202, neckband 1205, or some combination thereof. Furthermore, Pairing external devices, such as neckband 1205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 1205 may be communicatively coupled with eyewear device 1202 and/or to other devices. These other devices may provide certain functions (e.g., tracking, localizing, depth mapping, processing, storage, etc.) to augmented-reality system 1200. In the embodiment of FIG. 12, neckband 1205 may include two acoustic transducers (e.g., 1220(I) and 1220(J)) that are part of the microphone array (or potentially form their own microphone subarray). Neckband 1205 may also include a controller 1225 and a power source 1235.

Acoustic transducers 1220(I) and 1220(J) of neckband 1205 may be configured to detect sound and convert the detected sound into an electronic format (analog or digital). In the embodiment of FIG. 12, acoustic transducers 1220(I) and 1220(J) may be positioned on neckband 1205, thereby increasing the distance between the neckband acoustic transducers 1220(I) and 1220(J) and other acoustic transducers 1220 positioned on eyewear device 1202. In some cases, increasing the distance between acoustic transducers 1220 of the microphone array may improve the accuracy of beamforming performed via the microphone array. For example, if a sound is detected by acoustic transducers 1220(C) and 1220(D) and the distance between acoustic transducers 1220(C) and 1220(D) is greater than, for example, the distance between acoustic transducers 1220(D) and 1220(E), the determined source location of the detected sound may be more accurate than if the sound had been detected by acoustic transducers 1220(D) and 1220(E).

Controller 1225 of neckband 1205 may process information generated by the sensors on 1205 and/or augmented-reality system 1200. For example, controller 1225 may process information from the microphone array that describes sounds detected by the microphone array. For each detected sound, controller 1225 may perform a direction-of-arrival (DOA) estimation to estimate a direction from which the detected sound arrived at the microphone array. As the microphone array detects sounds, controller 1225 may populate an audio data set with the information. In embodiments in which augmented-reality system 1200 includes an inertial measurement unit, controller 1225 may compute inertial and spatial calculations from the IMU located on eyewear device 1202. A connector may convey information between augmented-reality system 1200 and neckband 1205 and between augmented-reality system 1200 and controller 1225. The information may be in the form of optical data, electrical data, wireless data, or any other transmittable data form. Moving the processing of information generated by augmented-reality system 1200 to neckband 1205 may reduce weight and heat in eyewear device 1202, making it more comfortable to the user.

Power source 1235 in neckband 1205 may provide power to eyewear device 1202 and/or to neckband 1205. Power source 1235 may include, without limitation, lithium ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial reality systems may, instead of blending an artificial reality with actual reality, substantially replace one or more of a user's sensory perceptions of the real world with a virtual experience. One example of this type of system is a head-mounted device such as a head-worn display system, such as virtual-reality system 1300 in FIG. 13, that may mostly or completely cover a user's field of view. Virtual-reality system 1300 may include a front rigid body 1302 and a band 1304 shaped to fit around a user's head. Virtual-reality system 1300 may also include output audio transducers 1306(A) and 1306(B). Furthermore, while not shown in FIG. 13, front rigid body 1302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1200 and/or virtual-reality system 1300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, that may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 1200 and/or virtual-reality system 1300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 1100, augmented-reality system 1200, and/or virtual-reality system 1300 may include one or more optical sensors, such as two-dimensional (2D) or three-dimensional (3D) cameras, time-of-flight depth sensors, single-beam or sweeping laser rangefinders, 3D LiDAR sensors (e.g., light detection and ranging sensors), and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 11 and 13, output audio transducers 1108 (A), 1108(B), 1306(A), and 1306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1110 may include condenser microphones, dynamic microphones, ribbon microphones, and/or any other type or form of input transducer. In some embodiments, a single transducer may be used for both audio input and audio output.

Figure 13:
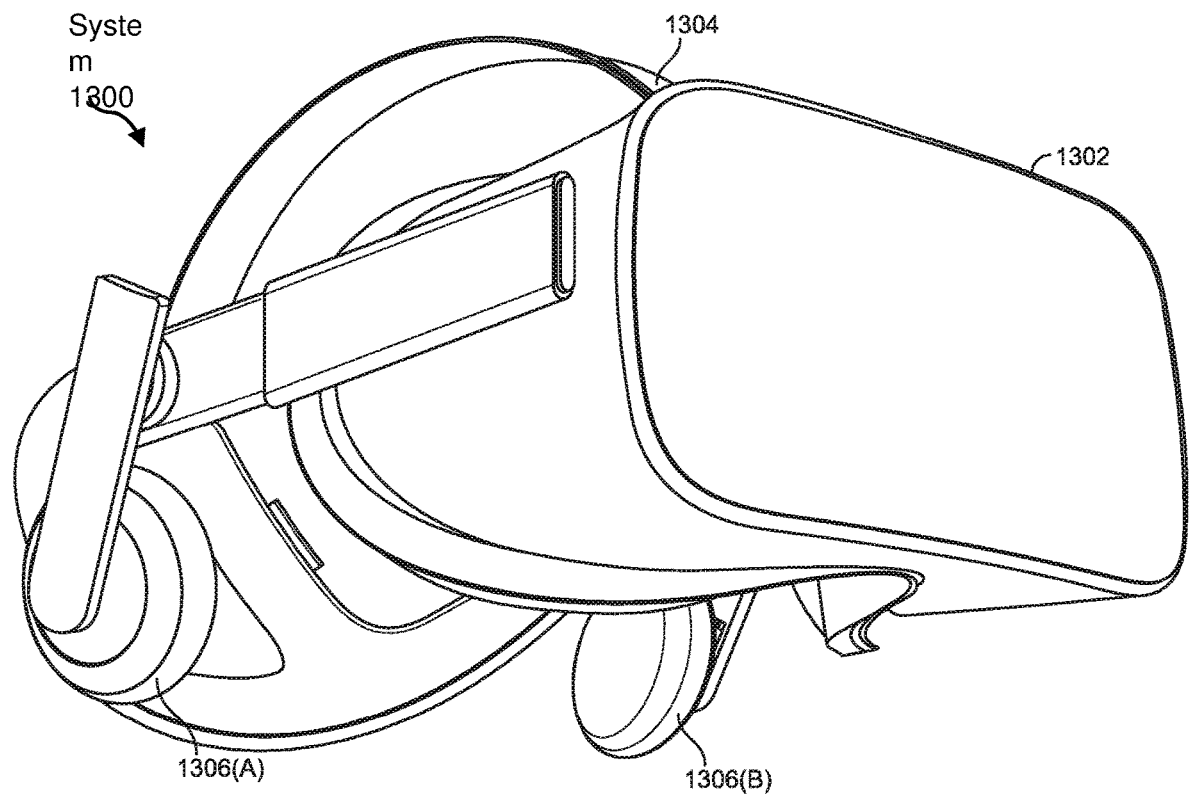
FIG. 13 is an illustration of an exemplary virtual-reality headset that may be used in connection with embodiments of this disclosure.

While not shown in FIGS. 11-13, artificial reality systems may include tactile (i.e., haptic) feedback systems, that may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, the artificial reality systems described herein may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, that may also be referred to as cutaneous feedback) and/or kinesthetic feedback (e.g., feedback that a user detects via receptors located in muscles, joints, and/or tendons).

Figure 14:
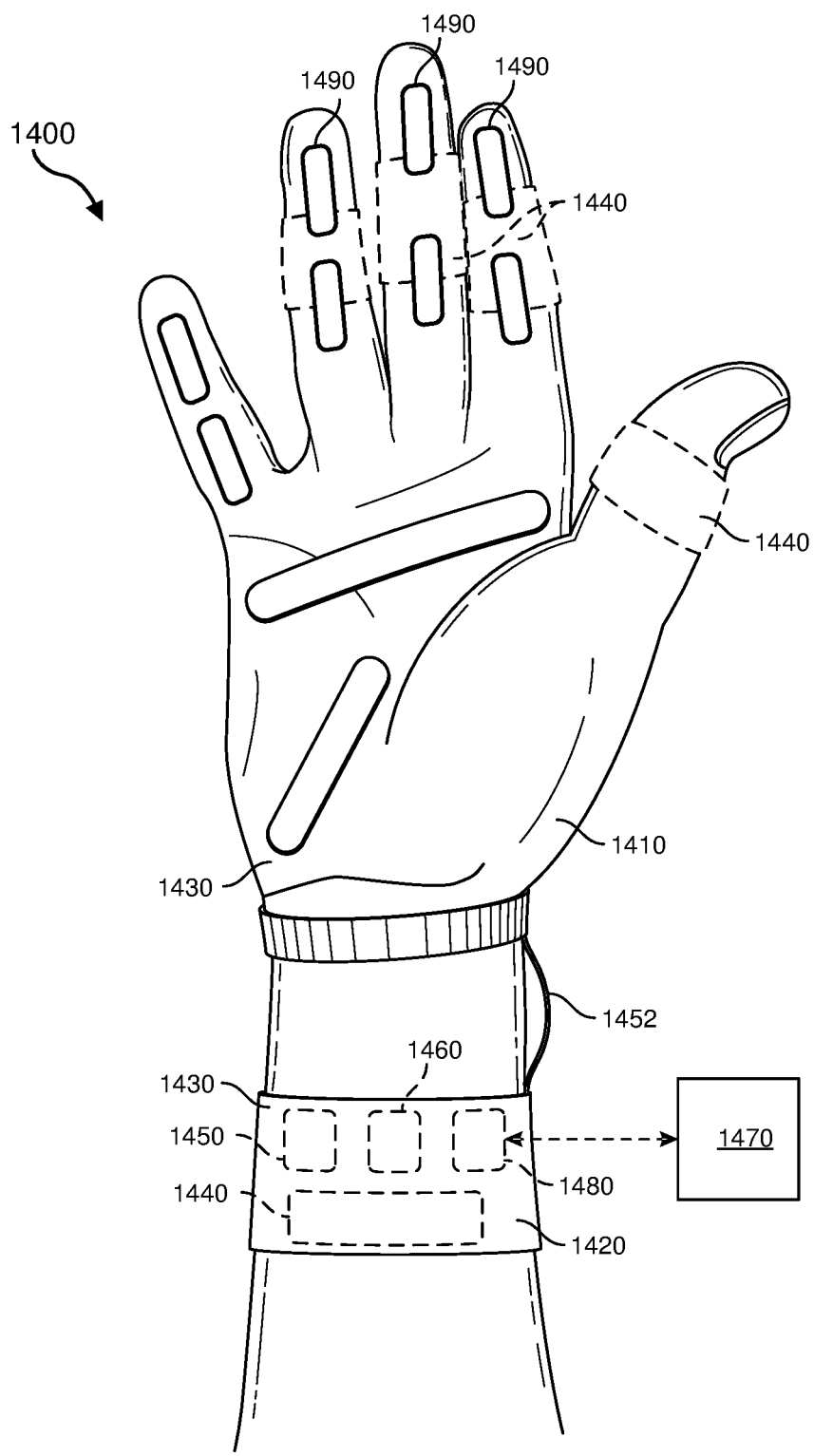
FIG. 14 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 14 illustrates a vibrotactile system 1400 in the form of a haptic device 1410 (that may be or include a wearable glove) and haptic device 1420 (that may be or include a wristband). Haptic device 1410 and haptic device 1420 are shown as examples of wearable devices that include a textile material 1430, that may be flexible and/or wearable and that may be shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1440 may be positioned at least partially within one or more corresponding pockets formed in textile material 1430 of vibrotactile system 1400. Vibrotactile devices 1440 may be positioned in locations to provide a vibrating sensation (e.g., haptic feedback) to a user of vibrotactile system 1400. For example, vibrotactile devices 1440 may be positioned to be against the user's finger(s), thumb, or wrist, as shown in FIG. 14. Vibrotactile devices 1440 may, in some examples, be sufficiently flexible to conform to or bend with the user's corresponding body part(s).

A power source 1450 (e.g., a battery) for applying a voltage to the vibrotactile devices 1440 for activation thereof may be electrically coupled to vibrotactile devices 1440, such as via conductive wiring 1452. In some examples, each of vibrotactile devices 1440 may be independently electrically coupled to power source 1450 for individual activation. In some embodiments, a processor 1460 may be operatively coupled to power source 1450 and configured (e.g., programmed) to control activation of vibrotactile devices 1440.

Vibrotactile system 1400 may be implemented in a variety of ways. In some examples, vibrotactile system 1400 may be a standalone system with integral subsystems and components for operation independent of other devices and systems. As another example, vibrotactile system 1400 may be configured for interaction with another device or system 1470. For example, vibrotactile system 1400 may, in some examples, include a communications interface 1480 for receiving and/or sending signals to the other device or system 1470. The other device or system 1470 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1480 may enable communications between vibrotactile system 1400 and the other device or system 1470 via a wireless (e.g., Wi-Fi, Bluetooth, cellular, radio, etc.) link or a wired link. If present, communications interface 1480 may be in communication with processor

1460, such as to provide a signal to processor 1460 to activate or deactivate one or more of the vibrotactile devices 1440.

Vibrotactile system 1400 may optionally include other subsystems and components, such as touch-sensitive pads 1490, pressure sensors, motion sensors, position sensors, lighting elements, and/or user interface elements (e.g., an on/off button, a vibration control element, etc.). During use, vibrotactile devices 1440 may be configured to be activated for a variety of different reasons, such as in response to the user's interaction with user interface elements, a signal from the motion or position sensors, a signal from the touch-sensitive pads 1490, a signal from the pressure sensors, a signal from the other device or system 1470, etc.

Although power source 1450, processor 1460, and communications interface 1480 are illustrated in FIG. 14 as being positioned in haptic device 1420, this is optional. For example, one or more of power source 1450, processor 1460, or communications interface 1480 may be positioned within haptic device 1410 or within another wearable textile.

Figure 15:
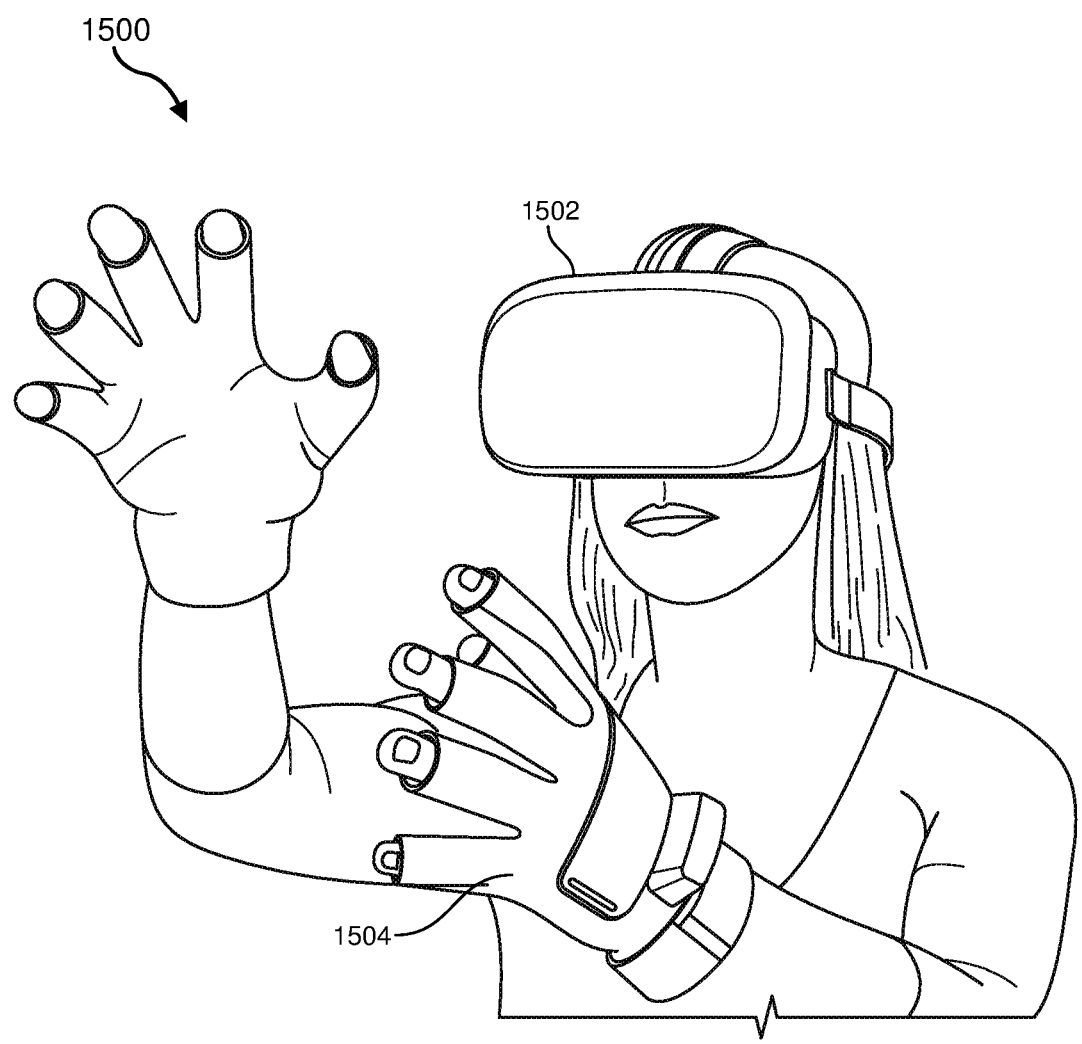
FIG. 15 is an illustration of an exemplary virtual-reality environment according to embodiments of this disclosure.

Haptic wearables, such as those shown in and described in connection with FIG. 14, may be implemented in a variety of types of artificial-reality systems and environments. FIG. 15 shows an example artificial reality environment 1500 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1502 generally represents any type or form of virtual-reality system, such as virtual-reality system 1300 in FIG. 13. Haptic device 1504 generally represents any type or form of wearable device, worn by a use of an artificial reality system, that provides haptic feedback to the user to give the user the perception that he or she is physically engaging with a virtual object. In some embodiments, haptic device 1504 may provide haptic feedback by applying vibration, motion, and/or force to the user. For example, haptic device 1504 may limit or augment a user's movement. To give a specific example, haptic device 1504 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1504 to send action requests to a console. Examples of action requests include, without limitation, requests to start an application and/or end the application and/or requests to perform a particular action within the application.

Figure 16:
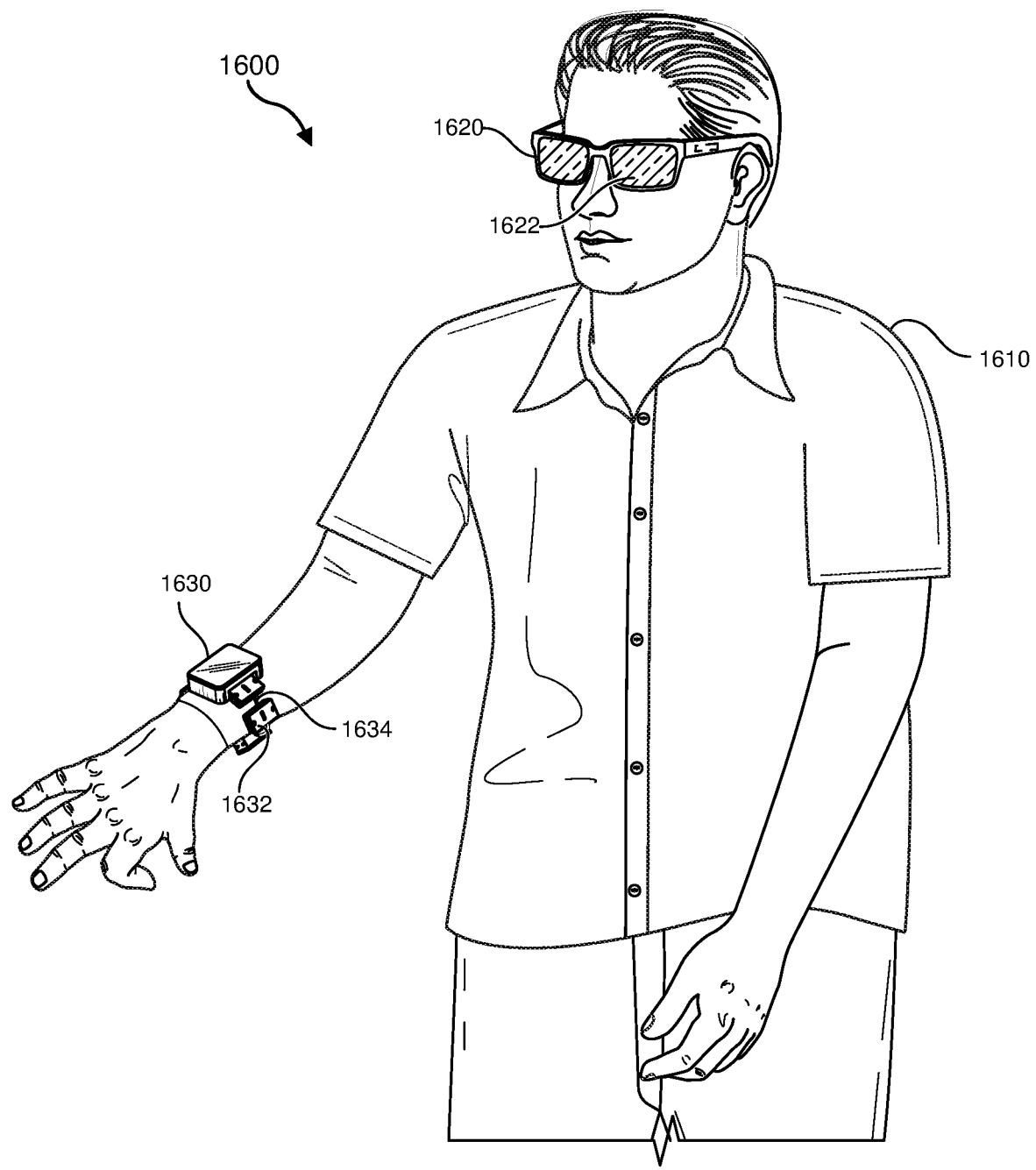
FIG. 16 is an illustration of an exemplary augmented-reality environment according to embodiments of this disclosure.

While haptic interfaces may be used with virtual-reality systems, as shown in FIG. 15, haptic interfaces may also be used with augmented-reality systems, as shown in FIG. 16. FIG. 16 is a perspective view a user 1610 interacting with an augmented-reality system 1600. In this example, user 1610 may wear a pair of augmented-reality glasses 1620 that have one or more displays 1622 and that are paired with a haptic device 1630. Haptic device 1630 may be a wristband that includes a plurality of band elements 1632 and a tensioning mechanism 1634 that connects band elements 1632 to one another.

One or more of band elements 1632 may include any type or form of actuator suitable for providing haptic feedback. For example, one or more of band elements 1632 may be configured to provide one or more of various types of cutaneous feedback, including vibration, force, traction, texture, and/or temperature. To provide such feedback, band elements 1632 may include one or more of various types of actuators. In one example, each of band elements 1632 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1410, 1420, 1504, and 1630 may include any suitable number and/or type of haptic transducer, sensor, and/or feedback mechanism. For example, haptic devices 1410, 1420, 1504, and 1630 may include one or more mechanical transducers, piezoelectric transducers, and/or fluidic transducers. Haptic devices 1410, 1420, 1504, and 1630 may also include various combinations of different types and forms of transducers that work together or independently to enhance a user's artificial-reality experience. In one example, each of band elements 1632 of haptic device 1630 may include a vibrotactor (e.g., a vibrotactile actuator) configured to vibrate in unison or independently to provide one or more of various types of haptic sensations to a user.

The present disclosure may anticipate or include various methods, such as computer-implemented methods. Method steps may be performed by any suitable computer-executable code and/or computing system, and may be performed by the control system of a virtual and/or augmented reality system. Each of the steps of example methods may represent an algorithm whose structure may include and/or may be represented by multiple sub-steps.

In some examples, a system according to the present disclosure may include at least one physical processor and physical memory including computer-executable instructions that, when executed by the physical processor, cause the physical processor to adjust the optical properties of a fluid lens substantially as described herein.

In some examples, a non-transitory computer-readable medium according to the present disclosure may include one or more computer-executable instructions that, when executed by at least one processor of a computing device, cause the computing device to adjust the optical properties of a fluid lens substantially as described herein. For example, an augmented or virtual reality device may include a computing device and a fluid lens as described herein.

As detailed above, computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference may be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device including a fluid lens, wherein the fluid lens comprises:
    a membrane;
    a substrate; and
    a fluid located within an enclosure formed at least in part by the membrane and the substrate, wherein:
        the membrane is an elastic membrane;
        the fluid comprises an amount of an additive that is effective to appreciably reduce bubble formation within the fluid;
        the additive comprises particles;
        the particles are silica nanoparticles;
        an associated fluid volume associated with each silica nanoparticle is less than a stable bubble volume for a stable bubble within the fluid; and
        the associated fluid volume is determined by dividing a fluid volume by a number of the silica nanoparticles within the fluid volume.

2. The device of claim 1, wherein the fluid includes a silicone oil, a polyphenyl ether, or a polyphenyl thioether.

3. The device of claim 1, wherein the fluid comprises a suspension of the particles.

4. The device of claim 1, wherein the particles have a hydrophobic surface.

5. The device of claim 1, wherein the particles interact with each other to form particle aggregates within the fluid.

6. The device of claim 1, wherein the additive imparts appreciable thixotropic properties to the fluid.

7. The device of claim 6, wherein the fluid has a viscosity, and the viscosity of the fluid is reduced during an adjustment of the fluid lens.

8. The device of claim 1, wherein the device comprises nucleation sites for bubble formation within the fluid.

9. The device of claim 8, wherein the nucleation sites include the particles.

10. The device of claim 8, wherein
    the enclosure has an enclosure surface, and
    the nucleation sites include surface features formed on the enclosure surface.

11. The device of claim 10, wherein the surface features comprise at least one of a surface protrusion, a surface depression, or at least one of the particles supported by the enclosure surface.

12. The device of claim 1, wherein:
    the elastic membrane has a profile; and
    the fluid lens further comprises a support structure configured to:
        retain the elastic membrane under tension, and
        allow modification of an optical property of the fluid lens by allowing an adjustment of the profile of the elastic membrane.

13. The device of claim 12, wherein the fluid is a thixotropic fluid, and a viscosity of the fluid is reduced during the adjustment of the profile of the elastic membrane.

14. The device of claim 1, wherein the device is an eyewear device that comprises a frame configured to support the fluid lens.

15. A method, comprising:
- assembling a fluid lens assembly including a substrate and an elastic membrane, the fluid lens assembly having an enclosure at least partially enclosed by the substrate and the elastic membrane, the enclosure having an interior surface; and
- introducing a lens fluid into the enclosure to form a fluid lens, wherein:
- the lens fluid includes a suspension of particles;
- the particles are silica nanoparticles;
- an associated fluid volume associated with each silica nanoparticle is less than a stable bubble volume for a stable bubble within the fluid; and
- the associated fluid volume is determined by dividing a fluid volume by a number of the silica nanoparticles within the fluid volume.

16. The method of claim 15, wherein the lens fluid comprises an amount of the particles that is effective to appreciably reduce bubble formation within the lens fluid.

17. The method of claim 15, wherein assembling the fluid lens assembly includes forming a plurality of nucleation sites on the interior surface of the enclosure.

18. The method of claim 17, further comprising forming a number of nucleation sites that is effective to appreciably reduce bubble formation within the lens fluid.

* * * * *